(12) United States Patent
Atkin et al.

(10) Patent No.: US 8,220,704 B2
(45) Date of Patent: Jul. 17, 2012

(54) METHODS FOR LOW COST MANUFACTURING OF COMPLEX LAYERED MATERIALS AND DEVICE

(75) Inventors: Micah James Atkin, Glen Huntly (AU); Gregory Francis Eaton, Rhyll (AU)

(73) Assignee: Mycrolab Diagnostics Pty Ltd, Melbourne (AU)

( * ) Notice: Subject to any disclaimer, the term of this patent is extended or adjusted under 35 U.S.C. 154(b) by 772 days.

(21) Appl. No.: 12/223,215

(22) PCT Filed: Jan. 24, 2007

(86) PCT No.: PCT/AU2007/000061
§ 371 (c)(1),
(2), (4) Date: Dec. 30, 2008

(87) PCT Pub. No.: WO2007/085043
PCT Pub. Date: Aug. 2, 2007

(65) Prior Publication Data
US 2011/0028293 A1 Feb. 3, 2011

Related U.S. Application Data

(60) Provisional application No. 60/761,746, filed on Jan. 25, 2006, provisional application No. 60/811,436, filed on Jun. 7, 2006.

(30) Foreign Application Priority Data

Jan. 24, 2006 (AU) .................................. 2006900345
Jun. 7, 2006 (AU) .................................. 2006903100

(51) Int. Cl.
*G06F 17/00* (2006.01)

(52) U.S. Cl. ........ 235/375; 235/492; 493/374; 426/106; 257/737
(58) Field of Classification Search ................... 235/375, 235/492; 493/374; 426/106; 257/737
See application file for complete search history.

(56) References Cited

U.S. PATENT DOCUMENTS

| 5,122,214 | A | * | 6/1992 | Zurfluh et al. | ................ | 156/220 |
| 6,305,609 | B1 | | 10/2001 | Melzer et al. | | |
| 7,377,446 | B2 | * | 5/2008 | Ohta et al. | ................... | 235/492 |
| 7,879,213 | B2 | * | 2/2011 | Say et al. | ................ | 204/403.01 |
| 2002/0054835 | A1 | * | 5/2002 | Robotti et al. | ................ | 422/103 |
| 2002/0143287 | A1 | * | 10/2002 | Buzot | ............................ | 604/14 |

(Continued)

FOREIGN PATENT DOCUMENTS

EP 0 339 275 B1 5/1996

(Continued)

*Primary Examiner* — Allyson Trail

(57) ABSTRACT

A process for manufacturing a device includes performing a plurality of non-bonding processes during at least one web-based manufacturing stage and during at least one sheet-based manufacturing stage. The processes may be performed by a plurality of modules. The modules may be independently controlled and/or monitored. The modules may be interchangeable. One or more modules may receive and/or pass material to another module. The devices that are manufactured may be a layered device, a smart card, a sensor, an actuator, an in vitro diagnostic device, a microfluidic device, or a laminar product. An apparatus for manufacturing device includes at least one web-based manufacturing component and at least one sheet-based manufacturing component. The at least one web-based manufacturing component and the at least one sheet-based manufacturing component are configured to perform a plurality of non-bonding processes.

1 Claim, 27 Drawing Sheets

U.S. PATENT DOCUMENTS

| | | | |
|---|---|---|---|
| 2006/0078986 A1* | 4/2006 | Ly et al. | 435/287.2 |
| 2006/0192285 A1* | 8/2006 | Kilger et al. | 257/737 |
| 2007/0057179 A1* | 3/2007 | Bousse et al. | 250/288 |
| 2009/0181406 A1* | 7/2009 | Ridder et al. | 435/7.1 |
| 2009/0250132 A1* | 10/2009 | Bivin et al. | 138/39 |

FOREIGN PATENT DOCUMENTS

| | | |
|---|---|---|
| EP | 1 473 152 A1 | 11/2004 |
| WO | WO 99/21713 | 5/1999 |
| WO | WO 00/27634 | 5/2000 |
| WO | WO 2007/085043 | 8/2007 |

* cited by examiner

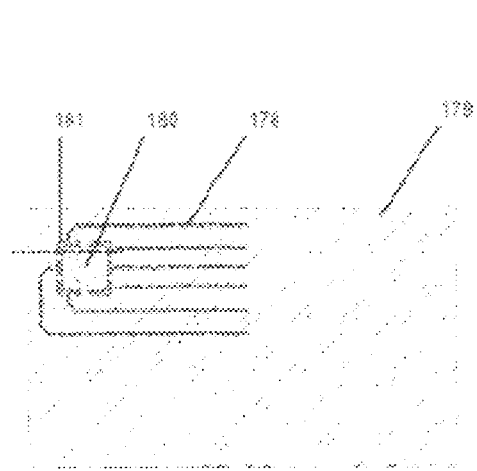
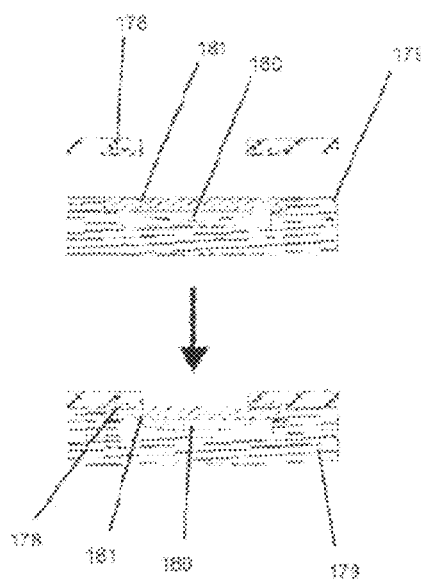
Figure 24A    Figure 24B
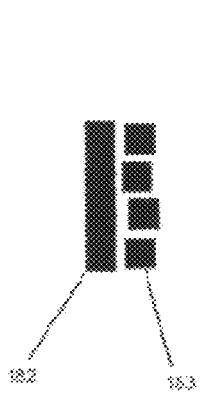
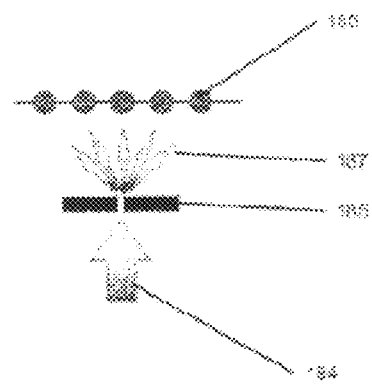
Figure 25A    Figure 25B
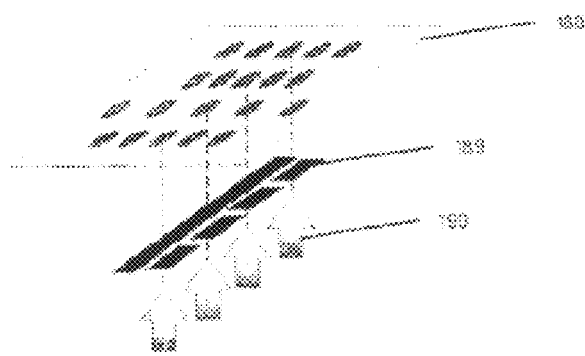
Figure 26

METHODS FOR LOW COST MANUFACTURING OF COMPLEX LAYERED MATERIALS AND DEVICE

CROSS-REFERENCE TO RELATED APPLICATIONS

This application is the National Stage of International Application No. PCT/AU2007/000061, filed Jan. 24, 2007, which claims priority to U.S. Application 60/761,746, filed 25 Jan. 2006, the entire contents of which are incorporated herein by reference. This application also claims priority to U.S. Application 60/811,436, filed 7 Jun. 2006, the entire contents of which are incorporated by reference. This application also claims priority to Australian Application 2006903100 filed 7 Jun. 2006, the entire contents of which are incorporated by reference. This application also claims priority to Australian Application 2006900345, filed 24 Jan. 2006, the entire contents of which are incorporated by reference.

FIELD OF THE INVENTION

This invention relates generally to the manufacture of complex layered materials and devices having one or more layers of suitably modified, altered or applied material. More particularly, the present invention relates to methods of manufacturing these materials and devices at a low cost, in variable volumes and at the same time with a high degree of variability and precision complexity under varying degrees of manual or automatic control. Moreover, this invention further relates to methods that allow efficient manufacture of layered materials and devices of differing functionality and complexity using the same manufacturing facility. The field of this invention also extends to the efficient manufacture of complex polymeric materials and devices, with manufactured features of variable and controlled size from centimeters to nanometers.

BACKGROUND OF THE INVENTION

In the discussion that follows, reference is made to certain structures and/or methods. However, the references should not be construed as an admission that these structures and/or methods constitute prior art. Applicants expressly reserve the right to demonstrate that such structures and/or methods do not qualify as prior art.

Many industries have moved to layered materials to take advantage of the increased material characteristics and functionality provided by such composite materials. A simple example is the weather protection that paint provides for the strength that steel provides. A complex example is the miniature fluid channelling and micro reaction chambers made possible by bonding layers of etched and cut planar sheets of appropriate materials. Another complex example is the production of multiple layer printed circuit boards allowing much more complex circuits than were ever possible with single or dual layer materials. Another example is the bonding of supporting layers to delicate fabrics thereby increasing their durability without sacrificing texture and visual appeal. An example of a layered multi-functional device is the "SMART" card wherein many layers incorporating graphics, electronics, magnetics, and tactile features are incorporated into the one multi-layered device.

Much effort has been put into developing new processes to facilitate higher productivity and lower cost manufacturing of such composite layered materials. Over time, two streams of basic process engineering have developed. One method has concentrated on individual devices and streamlined the processes to layer or laminate complexity and/or functionality. The other method has concentrated on mass production of a long layered sheet from which individual devices are excised after modification.

Each of these methodologies have their advantages. The first methodology allows materials and devices of high complexity to be manufactured, but at high cost. The other methodology allows materials and devices to be mass produced at a lower cost, but with a concomitant reduction in complexity.

Further deficiencies and impediments in these methods create production compromises which further hinder attainment of the goal of low cost mass production of complex layered devices. Attempts have been made to combine these processes to achieve these aims but with varying and limited success.

Polymers have been used as a cheaper alternative to metals for manufacturing consumable devices especially since the 1940's and have been used for mass producing complex materials and devices for instrumentation since the early to mid 1990's. Since the use of polymers in low cost mass production is predominant, this discussion concerns the use of polymers, but applies equally to the use of other materials, including metals, metal oxides, metal foils, ceramics, glasses and thin or thick film surface coatings of these materials or combinations of them.

As well as the two main general process methodologies discussed above, surface feature fabrication techniques developed in the latter part of last century generally can be classified into two further categories.

The first is using direct machining methods in which the pattern of desired features is created directly on the surface of a stratum made of a suitable material. These methods include micromilling, laser based lithography and beam scanning, plasma etching, wet chemical UV lithography using photoresists, soft lithography, x-ray lithography and print-head deposition. Of these techniques, laser based processes have shown the most development due to the ease of processing and their ability to generate spatially confined sub-micron sized anisotropic features in a variety of materials.

The second methodology involves processes that use a master template to form the desired pattern. These feature replication processes, including soft lithography, embossing, compression molding, thermoforming, injection molding and reaction injection molding, and are particularly suitable to use with polymers, although these techniques are used with other materials including low melting point metals and frits.

Most of these approaches to materials or device fabrication are limited to creating 2-dimensional or 2%-dimensional structures. The most common of these approaches use one or more of Computer Numerical Control (CNC) micromilling, injection-molding or hot embossing, which can generate only very limited feature complexity. For the fabrication of complex 3-dimensional polymeric parts these micro-structuring methods typically require the assembly of several separately produced parts. However, these are serial fabrication processes that have alignment challenges when assembling micro-parts which lead to further labor-intensive processes with relatively low throughput and high associated production costs.

Another recent approach to the fabrication of complex polymeric materials and devices is the stacking, aligning and bonding of several layers of thin, already fabricated strata (films). This layered approach allows the use of relatively simple 2-dimensional manufacturing techniques (such as embossing, die cutting, and laser processing) as well as established bonding technologies to create complex 3-dimensional materials or devices. Such a 3-dimensional design approach is especially suited to high-volume manufacturing using reel-to-reel processing as described by Mehalso ("The Microsystems Road in the USA," Mstnews, Volume 4/02, pp. 6-8 (2002)) and Schuenemann et al. ("Packaging of Disposable Chips for Bioanalytical Applications," IEEE Electronic Components & Technology Conference, Nevada, USA (2004)).

Market pressures have prompted the development of mass manufacturing strategies away from traditional fixed production line approaches and towards flexible and responsive manufacturing systems to provide speed and rapid adaptation to meet market demands. This new manufacturing approach has typically been applied towards individual machine flexibility, or where discrete parts are produced on an assembly line, towards flexibility in redirecting or reordering the various production line modules. However, this is a more difficult proposition for reel-to-reel systems where the production line is a continuous process. Although U.S. Pat. No. 4,805,111 describes a modularized web system that can allow reconfiguration of the line, the flexibility of the system and the complexity of the produced devices are limited due to the continuous nature of the supply feed of the source materials when the system is in use.

To date, for layered polymeric device production, only batch, serial or continuous reel-to-reel processing techniques have been described.

In a typical batch process a large quantity or a number of products are fabricated in a single batch by a serial sequence of processes. In micro-technology, batch processing is very common in the fabrication of silicon or glass-based devices. An example is the fabrication of an integrated circuit, in which a silicon wafer is used as the substrate, and is subjected to a number of subsequent subtractive and additive techniques to form electronic parts such as gates and transistors within or upon the surface of the substrate. After these processing steps are completed, the devices are separated and packaged. In another batch process example, polymer bank notes are printed using a printing principle in which sheets or coupons containing several tens of notes are processed simultaneously and then separated in a final process step. Recent techniques combine this printing principle with the embossing of anti-counterfeiting micro-features into the surface of the polymer notes.

These batch manufacturing technologies, however, are rather expensive, especially when involving micro-features. The main industrial applications of devices made according to such methods are in high-throughput-oriented products in large industrial, scientific and governmental laboratories where the component can be reused, therefore the cost is amortized over the device's operational lifespan. For many potential applications of miniaturized layered bio-analytical devices, especially in disposable parts for point-of-care/point-of-use devices, such high production costs cannot be justified.

Batch-based fabrication of layered polymer based devices can be, and is, used to form multiple miniaturized devices through a sequence of processes, such as die cutting, bonding, milling and laser cutting. However due to the technical challenge of miniaturization and the need for such devices to reliably interface to real world samples and instruments, layered polymeric devices made this way are typically larger than their silicon or glass counterparts and provide unique packaging challenges. Furthermore, these batch-based processes can be difficult to automate, making the storing, handling, aligning and assembling of the produced micro-parts a commercial and technical challenge in itself. Consequently the number of devices that can be economically fabricated in parallel from a polymer batch-based process is restricted, making this method suitable for only low volume production.

Serial manufacturing is a manufacturing strategy in which manufacturing processes interact with a succession of single work pieces (or a very small number of work pieces). Examples are injection molding, hot embossing, or mechanical milling. Whereas each of these processes, widely used in industry, are optimized for high throughput, and several automation strategies to link serial processes are well in place for conventional products, the cycle times, the complexity and the cost of the necessarily highly automated process sequences all increase significantly for micro-structured devices. Storing, handling, assembling and aligning micro-parts in a competitive industrial environment remain the technical and economical challenges. Serial manufacturing processes are therefore best for small to medium-size production series.

A promising alternative to batch and serial manufacturing techniques are reel-to-reel, or so called web-based, processes. These are high-throughput production processes for combining composite polymer laminates used commonly in the packaging and printing industries, and have recently been described for complex layered device fabrication See Mehalso and Scheunaman et al., discussed above. See, also, U.S. Pat. Nos. 6,803,019 and 6,878,345.

The process according to the present invention utilizes flexible strata (films) continuously fed from reels containing the individual devices which are therefore fabricated on a continuous substrate. The fabricated devices can then be used either on a reel in a similar manner as described in U.S. Pat. Nos. 6,803,019 and 6,878,345, or divided into their individual parts, as described by Mehalso, discussed above.

Such web-based production lines tend to be highly automated and therefore very labor-efficient. The main advantage of processing on such a continuous automated system is the high throughput that can typically be achieved at a relatively low cost. Although initial investment costs for a web-based production line are higher than for serial production, manufacturing costs per product can be very low for a suitable large-scale production line.

The main disadvantage of such reel-to-reel production lines is that they are typically very sensitive to process variations. If a single processing component on the line goes out of tolerance or fails, then, due to the continuous nature of the production line, all parts passing that point are affected and production is effectively curtailed. Stopping the line to fix the problematic part causes the entire production run to come to a halt.

The lines are typically dedicated to one specific product, and require large investments in setup time and optimization of parameters, particularly when dealing with the tight tolerance requirements for devices with micro-features. Due to this setup time, the lengths of the web systems and the total effect of misalignment due to wear and tear or component failure, there is typically a lot of material waste. Commercial systems typically allow for this waste as a fixed percentage add-on cost and the end price of the product is varied accordingly. Another disadvantage of a reel-to-reel system is that the slowest process in the system limits the speed of the whole production system.

Furthermore, the substrates in a reel-to-reel process need to be flexible to allow for the reel handling systems. See, for example, U.S. Pat. No. 6,827,906. This limits the thickness of the layers used and the number of layers that can be combined and still be handled in such a production line. This presents problems for many layered material applications that require larger interfaces to the environment, larger fluid capacities, large handling structures, or a higher degree of component strength, or large numbers of bonded layers all of which characteristics tend to make the resultant device very rigid and therefore severely restrict the suitability of a reel-to-reel production method.

Another disadvantage of reel-to-reel handling systems is that the substrates need to remain in a mostly planar form with external surfaces having little or no protuberances. As the substrate thickness is also limited by this method, this imposes further design constraints on the product, which often require larger 3-dimensionally shaped objects to provide functionality, such as interfacing to an external device or the provision of internal liquid storage compartments.

The reference to any prior art in this specification is not, and should not be taken as, an acknowledgement or any form of suggestion that the prior art forms part of the common general knowledge.

SUMMARY OF THE INVENTION

The present invention overcomes the limitations discussed above while retaining the advantages, and introduces new methods to remove or substantially reduce the deficiencies and impediments.

The present invention relates to methods for low cost, high volume manufacturing of complex layered materials and devices that are the result of an innovative combination of the disparate processes described above and new novel processes, which when combined substantially overcome the limitations of current practices while retaining advantages and introducing new advantages. Although applicable to the production of layered materials using any substrate material and any subsequent material, one embodiment of the invention relates to the production of complex polymeric devices with at least one layer of material and with functional features from centimeters to nanometers. The invention further provides for the introduction of non-polymeric materials into the process and provides for the precision placement of these materials to allow complex integrated functionality at low cost and high production volumes.

According to one embodiment of the present invention, there is provided a process for manufacturing a device comprising performing at least one web-based manufacturing stage and at least one sheet-based manufacturing stage. In a further embodiment, there is provided a process for manufacturing a device comprising performing at least at least one of the web-based manufacturing stage and at least one sheet-based manufacturing stage, wherein a plurality of non-bonding processes are performed: (a) within at least one or across more than one web-based manufacturing stage(s); and (b) within at least one or across more than one sheet-based manufacturing stage(s). In this embodiment, the plurality of non-bonding processes may be performed in a single web-based or a single sheet-based stage, or one non-bonding process may be performed may be performed in each of a plurality of web-based or in each of a plurality of sheet-based stages, provided that the process overall comprises a plurality of non-bonding stages in at least one of a single web-based or a sheet-based stage or collection of web-based or collection of sheet-based stages which make up the overall process.

In some embodiments, the process is modular, the processes may be performed by a plurality of modules and each module may be controlled independently. By 'non-bonding stage' is meant a process that does not bond (e.g., join or mate) the parts from the continuous line and the parts from the sheet (or discrete) line together. One example is lamination.

Some modular embodiments comprise a plurality of modules from which a particular module may be chosen depending on the production history and nature of the product being manufactured. Modules may also be interchangeable as required and may be capable of receiving or passing materials to another processing module.

The process according to this embodiment of the invention is capable of manufacturing a wide variety of devices, which may, for example, comprise one or more of: a) a layered device, b) a smart card c) a sensor or actuator, d) an electronic device, e) an in vitro diagnostic device, or f) a microfluidic device.

A manufacturing process according to the first embodiment of the invention has many advantages. For example, it simplifies changes in production strategies by increasing flexibility, improves line handling and reduces waste.

A process according to this embodiment of the invention may further comprise a control system which may optionally be within a module or between a plurality of modules. In some embodiments, each module is controlled independently. Furthermore, at least part of the process according to the present invention can be subjected to at least one of a distributed control system or a distributed monitoring system.

Routing, re-routing or directing of components in processes of the invention may be done by a suitable technique or device. In an embodiment, at least part of the device is assembled and/or stored on the manufacturing line. Furthermore, in some embodiments, components are directed during manufacture according to their identity. Thus, in one embodiment, a code may be added (for example, attached) to components and the code provides the identity of the components. In addition, components may be added to or removed from other components depending on their identity.

In another embodiment of the invention, there is provided a process in which there is provided in at least one module, use of a reel-to-reel process and in at least one other module, use of a sheet-based process to manufacture one or more aspects of the device. Such an embodiment is suitable for manufacture of a wide range of devices. For example, it may be suitable for manufacturing at least one of a) layered devices, b) smart cards c) sensors/actuators, d) electronic devices, e) IVD devices, and f) microfluidics devices.

A process according to the present invention may be used to make any suitable product. In one embodiment, it is used to make laminar products. Such laminar products may be of any suitable type. Furthermore, it may be adapted to manufacture complex products which optionally comprise: a plurality of materials, such as polymers, wood, paper, silicon, ceramics, and/or metals; and/or a plurality of shapes and/or thicknesses of material and/or preformed components.

In other embodiments, the process is such that it enables a device or component which is the subject of manufacture to pass at least one module or station a plurality of times. Furthermore, a device or component which is the subject of manufacture may travel in a plurality of directions along the manufacturing line and optionally either independently of the remainder of the production process.

Various types of device may be manufactured by a process according to the present invention, including folded devices.

The process of the invention may also additionally comprise at least one buffering station to handle buffer stock. It may also comprise a plurality of production arms and at least one production arm may comprise a plurality of processes.

According to another embodiment a laminar device is manufactured which is a diagnostic device, and in one embodiment, it is a microfluidic device. Various types of devices may be manufactured in this way, including folded devices which may for example be folded microfluidic devices.

Machining processes also form part of the present invention and one embodiment comprises multi-layer processing wherein a machining pattern is created on a plurality of layers. A sacrificial layer may also be used for machining, optionally when the machining is double sided.

In other embodiments, embossing is combined with at least one other process to improve structure replication. For example, it may comprise the use of cut-outs, undercuts, laser processing or any other suitable process.

Optical-based alignment systems also form part of the invention and may comprise diffractive optics, or the use of interference patterns such as moire patterns or any other suitable optical system.

Conductive elements may be incorporated into the device as part of the process of the invention. Such conductive elements may conduct heat or electricity. In one embodiment in which electrodes are added to the device, they are positioned so as to at least partially overlay a smart card carrier module. Conductive elements are added by various techniques and device, for example, hot foil stamping, interdiffusion or a printing technique.

Other processes may optionally incorporate at least one waveguide into the device. Any suitable technique may be used, for example: surface coating, by filling at least one preformed structure, by inserting at least one preformed component.

Suitable bonding processes for use with the present invention may include: use of at least one structural layer to minimize or avoid structure deformation, a mechanical interlocking technique or a surface modification technique.

According to another embodiment, the web-based (reel-to-reel) and sheet processes are used at different stages of production depending on the characteristics of the required process. This embodiment is particularly useful when production of certain types of product may require a step which can only be done by one or the other of these processes.

In another embodiment, there are provided a plurality of modules from which a particular module may be chosen depending on the production history and nature of the product being manufactured. In another embodiment there are a plurality of modules which are interchangeable as required. Preferably such interchange is automated.

The aspects which may be manufactured according to the reel-to-reel and sheet processes according to the present invention may be of any suitable type. For example, they may relate to the size, shape, functionality, added components, characteristics, etc., of the product in question.

According to another embodiment of the invention, one or more of the processing modules are capable of receiving or passing materials to another processing module. Such processing modules may be of any suitable type, for example, they may be sheet or reel-to-reel (feed) handlers, capable of receiving new material and able to operate with changes in direction of the material. Similarly, processing modules may be stations for conducting one or more processes such as structuring, bonding, printing, depositing, cleaning, surface treating, drying, inspecting, etc.

Control over modules according to the present invention may be by any suitable technique or device. For example, they may be independently controlled, or they may be under system control, or the control of another module. Such modules may also comprise feedback control systems, for example from different locations along a production line.

A modular process according to the present invention has many advantages, including:
  facilitating removal and insertion of partially completed components to increase productivity and better meet markets demands;
  maintenance and troubleshooting may be performed more easily and quickly;
  modules may be replaced easily with minimal disturbance to production;
  modules may be shut down without harming the ability to at least partially manufacture the product;
  the process may be further optimized;
  it is easier to meet specific customer requirements due to module independence and system design flexibility;
  less waste of materials;
  higher overall production output;
  increased ability to cope with variations in demand by more readily sharing load across multiple production lines;
  greater quality control through testing both at system and modular level; and
  replication of modules improves quality, lowers development and implementation costs and speeds delivery.

Another embodiment of the invention comprises distributed monitoring and control systems throughout the process. According to this embodiment, individual fabrication stages are self controlled and may inspect and label output material as having passed or failed so that subsequent or other disassociated controllers may read this information and process the material accordingly.

An advantage of certain embodiments of the present invention is that buffer stock of partially completed material can be identified (eg. machine identified) and later processed correctly according to this identification without the need for persistent computing memory of product process level and location. A further advantage is that material can be manually handled and processed and returned to a production line and recognized and processed accordingly. Such a system therefore obviates dedicated storage and dedicated transfer lines as material is recognized and routed appropriately wherever it enters the system. An example of this would be a partially completed web based reel loaded production returned to the input point after maintenance and the already completed processing stages would recognize and then ignore the web product until it reached its next stage in the process, thereby also obviating any unnecessary changes to the production line to accommodate the partially complete product. Another example would be manual repairs of rejected sheet based material and this material could be returned to the production line at any stage and recognized and routed accordingly to its next processing stage.

According to another embodiment of the present invention, there is provided a process for manufacturing a microfluidic device comprising performing at least one non-bonding and non-final separating process during at least one web-based manufacturing stage and during at least one sheet-based manufacturing stage. The microfluidic device so manufactured may, for example, comprise a folded microfluidic device. In some embodiments, the process is modular. By 'final part separation' is meant the stage at which a device or fabricated component has been separated from other components or parts at the end of the component or device assembly.

In another embodiment, there is provided a process which further comprises a multi-layer laminating step and in another, material from the one or more web-based processes is joined to the same side of the same part or, component or device.

In another embodiment, there is provided a process for manufacturing a multi-layer device comprising at least one web and at least one sheet-based manufacturing stage wherein one or more processes are performed on one or more web-based stages provided that such processes are not graphical printing nor cutting the device for final part separation.

According to another embodiment of the invention, there is provided an apparatus for manufacturing devices, comprising at least one web-based manufacturing component; and at least one sheet-based manufacturing component, wherein the at least one web-based manufacturing component and the at least one sheet-based manufacturing component are configured to perform a plurality of non-bonding processes. An apparatus according to this embodiment of the invention is suitable for manufacturing a wide variety of devices. In some embodiments, such an apparatus is suitable for manufacturing at least one of a) layered devices, b) smart cards c) sensors/actuators, d) electronic devices, e) IVD devices, and f) microfluidics devices. Furthermore, such an apparatus may also be suitable for manufacturing laminar (multilayer) products.

In another embodiment, there is provided an apparatus for manufacturing a microfluidic device, comprising at least one web-based manufacturing component; and at least one sheet-based manufacturing component, wherein the at least one web-based manufacturing component and the at least one sheet-based manufacturing component are configured to perform a plurality of non-bonding processes.

In another embodiment, there is provided a web-based manufacturing module for manufacturing a device, comprising: a reel configured to transfer a web; a reel-to-reel operative means for performing a manufacturing process on the web in relation to an aspect of the device; and an interactive means for enabling interaction of the web with at least one sheet processing module.

In a further embodiment, there is provided a sheet processing module for manufacturing a device, comprising: a sheet operative means for performing a manufacturing process on a sheet in relation to an aspect of the device; and an interaction means for enabling interaction of the sheet with at least one reel-to-reel processing module.

In another embodiment of the invention, a product is produced according to a process or with an apparatus according to the present invention.

In another embodiment, there is provided a process for manufacturing a multi-layered device wherein embossing is combined with at least one other process to replicate structure. The at least one other process may for example comprise using cut-outs, undercuts, laser processing or any other suitable process.

The invention also relates to a process for manufacturing a multi-layered device comprising optical alignment of components. Optical alignment may for example be by comprise using diffractive optics or interference patterns (such as moire patterns).

In another embodiment of the invention, there is provided a process for manufacturing a multi-layered device comprising incorporating at least one conductive element into the device and wherein the conductive element is incorporated by stamping. In another embodiment, a process for manufacturing a multi-layered device comprising incorporating at least one conductive element into the device and wherein multi-layered circuits are formed on multiple layers of non-conductive material bonded together. In a still further embodiment, there is provided a process for forming an interconnect and/or a via between conductive elements on a device, comprising stamping a part of a conductive material through a non-conductive layer.

In another embodiment, there is provided a process for forming an interconnect and/or via between conductive elements on a device comprising forming a first conductive layer on a substrate, adding one or more non-conductive materials onto the first conductive layer, selectively removing the non-conductive material, and forming a second conductive layer onto the non-conductive material at least partially overlapping the area of selectively removed non-conductive material.

The invention also includes a process for manufacturing a smart card comprising positioning electrodes so as to at least partially overlay a smart card carrier module.

In another embodiment, the invention relates to a process for manufacturing a microfluidic device, comprising directing components of the device according to their identity. This embodiment may further comprise the step of attaching a code to the components, wherein the code provides the identity of the components and directing components may comprise adding components to other components and/or removing components from other components depending on their identity.

In another embodiment of the present invention, there is provided a multilayered device comprising at least one stress-relieving structure to decrease substrate stress. The structure may relieve stress in any suitable way, for example it may relieve stress in a plurality of adjacent devices or within the device. In one embodiment, the device is a microfluidic device.

Throughout this specification (including any claims which follow), unless the context requires otherwise, the word 'comprise', and variations such as 'comprises' and 'comprising', will be understood to imply the inclusion of a stated integer or step or group of integers or steps, but not the exclusion of any other integer or step or group of integers or steps.

BRIEF DESCRIPTION OF DRAWINGS

Various embodiments of the present invention will be described with reference to the accompanying schematic drawings, wherein like reference characters denote like features, and wherein:

FIGS. 10A-10C illustrate an example of a folded laminate device, wherein FIG. 10A shows the side view of a laminated device with a folding region, FIG. 10B illustrates the folding of the device, and FIG. 10C shows the side view of the folded device;

FIGS. 12A and 12B illustrate the joining of an injection molded part to a card device;

FIGS. 24A and 24B illustrate the layering of an electrically conductive tracks over a device with smart card electrodes, wherein the cross section views show the electrical layer and the card component before and after bonding;

FIGS. 25A and 25B illustrate the top view of a diffraction forming structure used for alignment and a side view on diffraction forming structure, respectively;

FIG. 26 illustrates the resultant diffraction pattern used for alignment over several layers;

DETAILED DESCRIPTION

Figure 1A:
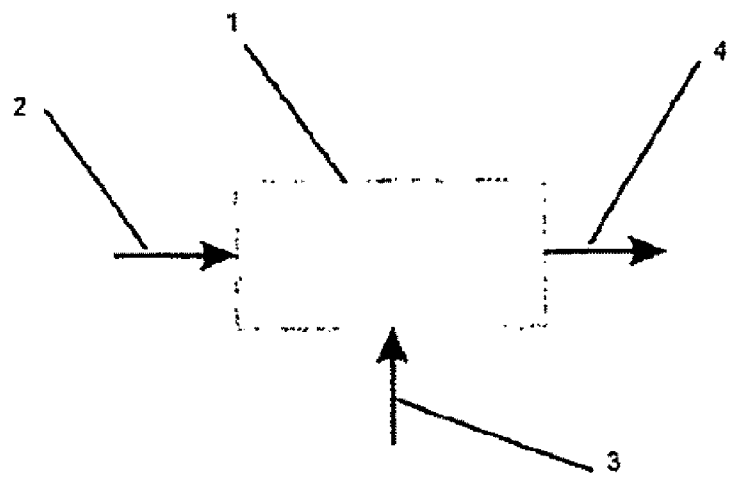
FIG. 1A represents a generic modular production unit.

It is convenient to describe the invention herein in relation to the disclosed embodiments relating to microfluidic devices. However, the invention is applicable to a wide range of situations and products and it is to be appreciated that other constructions and arrangements are also considered as falling within the scope of the invention. Various modifications, alterations, variations and or additions to the construction and arrangements described herein are also considered as falling within the ambit and scope of the present invention.

The manufacturing process of the invention overcomes the limitations described above for batch, serial, and reel-to-reel manufacturing of layered materials and devices, by combining reel-to-reel processing technology and sheet handling systems into a flexible production strategy that allows the fabrication of planar and non-planar devices of arbitrary thickness with precision 3-dimensional surface and internal features. Additional novel methods of manufacture are combined to further enhance the utility of the invention.

The advantages of such a combined manufacturing process include the ability to produce a much wider range of thickness in a multilayer device (from thin to very thick) and a much wider range of flexibility in a multilayer device (from very flexible to rigid), all processed on the one production line using both reel-to-reel based components and components from other sources, thereby enabling low cost, mass production of components and devices that are stronger, can store larger volumes, provide more adequate and more configurable interface to external devices and environments and contain increased functionality than would otherwise be the case using existing technology.

According to one embodiment of the invention, intermediate processes are performed as separate processes and the outputs stored for later input to other processes which can likewise be performed at one speed, which is a different speed than the intermediate processes. The various intermediate processes can be performed in one continuous high speed reel-to-reel system, and all manufacturing operations can be performed on one or more webs at the one speed. Such an embodiment avoids the situation in which the entire process must run at the speed of the slowest operation. This embodiment of the invention therefore allows the faster component operations to be performed at their optimal speed, thus freeing up equipment to be reconfigured to perform other operations, while at the same time the remainder of the process (or at least the slowest component operations) may run at the speed of its slowest operation. Thus, an overall increase in throughput with lower manufacturing cost is achieved.

In another embodiment of the invention, the produced layered web structures may be cut, rendered or divided into sheets to accommodate processes which by their very nature require batch processing or produce product which is too rigid for a web based process. This embodiment enables increased product complexity without sacrificing the ability to maximize the use of high speed web reel-to-reel processes. This "swap" between reel-to-reel and batch processing can be performed at any stage during the production process depending on the line configuration and production run size. Such a production strategy further reduces costs of small production runs by allowing the fabrication of partly completed components that can be finished at a later stage, enabling larger efficient production runs of generic base components using reel-to-reel, which are then completed with application-specific batch processes. Certain application-specific processes may complete the generic components separately due to various requirements, such as the need for batch based processing (as above) or smaller production runs. According to one embodiment, deposition of volatile reagents is delayed to extend the product's shelf life as well as the need for rigid product.

Similarly, in a further embodiment of the invention, sheet product may be introduced into a reel-to-reel process to maximize the use of complexities possible in some batch based processes while maintaining the overall efficiencies of a web based reel-to-reel process.

Figure 1B:
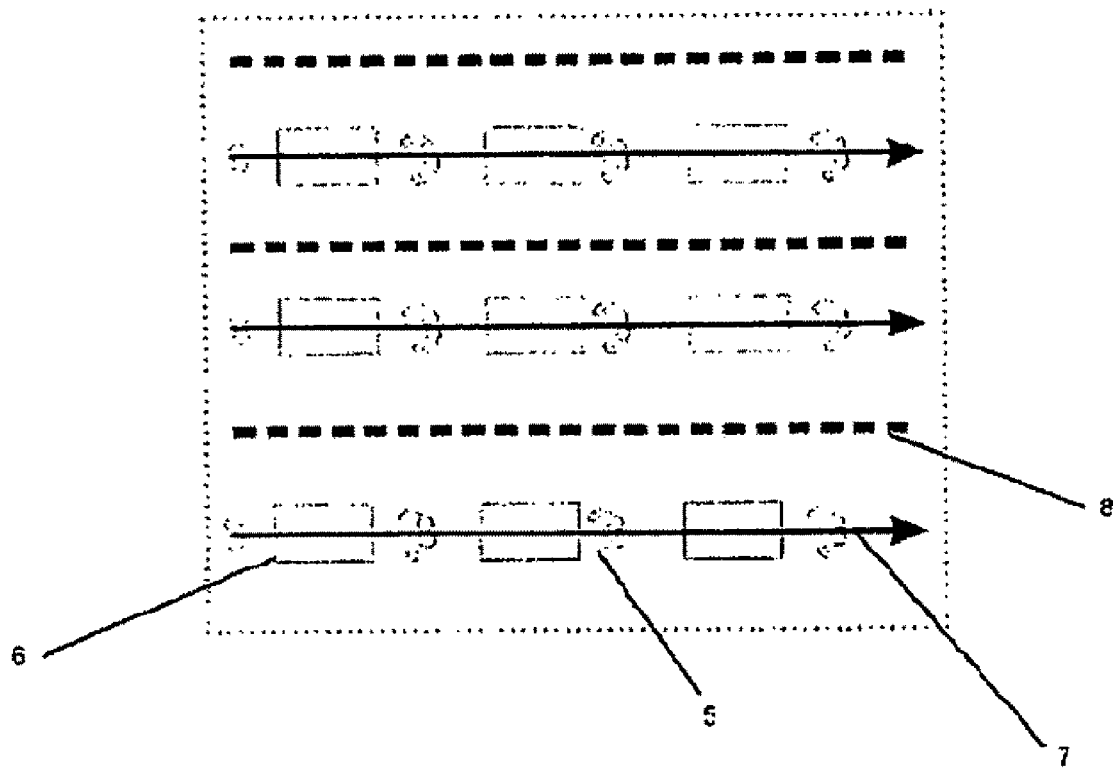
FIG. 1B illustrates 3×3 production units arranged to form a generic production cell.

Referring to FIG. 1A, a modular production unit (1) performs one or more production processes having a material input (2), control inputs (3), and an output (4). Examples of processing modules include sheet or reel feed handlers, capable of inserting new material or changing material direction, or stations for material inversion, bonding, printing, deposition, cleaning, surface treatment, drying, inspection or other manufacturing processes. A reconfigurable production cell containing 3×3 modular production units is depicted in FIG. 1B. In this example, rollers with optional unwind units (5) are provided between each production unit (6). The cell shows three separate transport lines (7) that may be output to other production units or cells. Alternatively, these lines may be combined or split prior to the cell output. Optional areas (8) for laminar flow hoods, debris shields, and sheet or reel level changing are provided.

Figure 2:
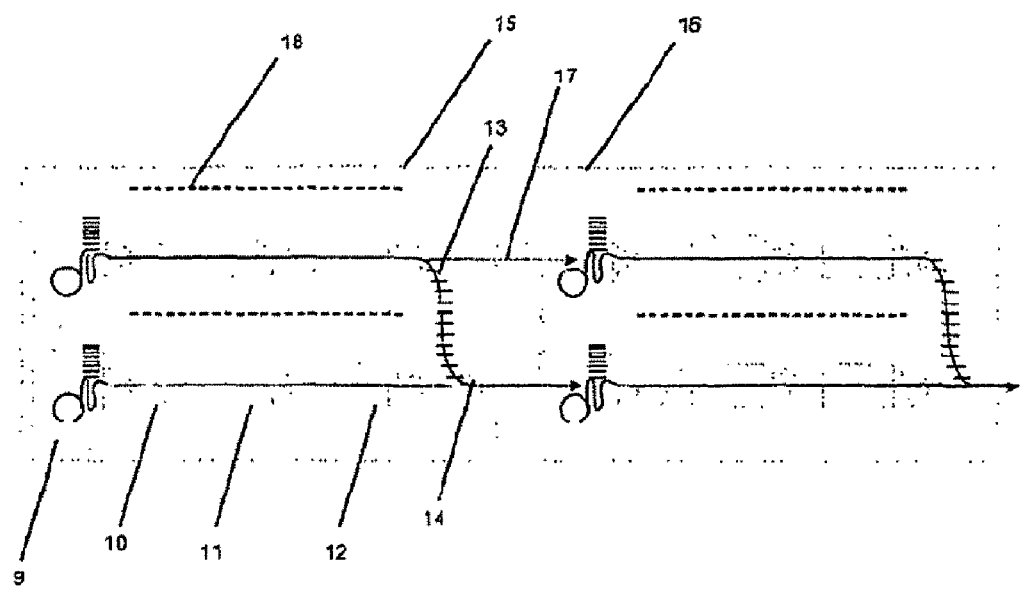
FIG. 2 illustrates two generic production cells with 2×3 production units connected in series.

An example of a possible configuration for two production cells containing 3×2 production units is depicted in FIG. 2. In this example, sheet or reel feed units (9) are passed through rotary cutters (10) to the modular unit for structuring, Printing, or deposition (11), and then past to a unit for cleaning, surface treating, drying and/or inspection (12) before bonding to another layer (13) that has been processed on a similar modular line at the bonding station (14). The output from the bonding station (14) can be fed into the input of another processing module for further processing. Alternatively, the outputs (17) of the first 2×3 production cell (15) can be passed separately onto the next production cell (16) without prior bonding. Debris shields or laminar flow hoods (18) can be provided between each processing line.

Figure 3:
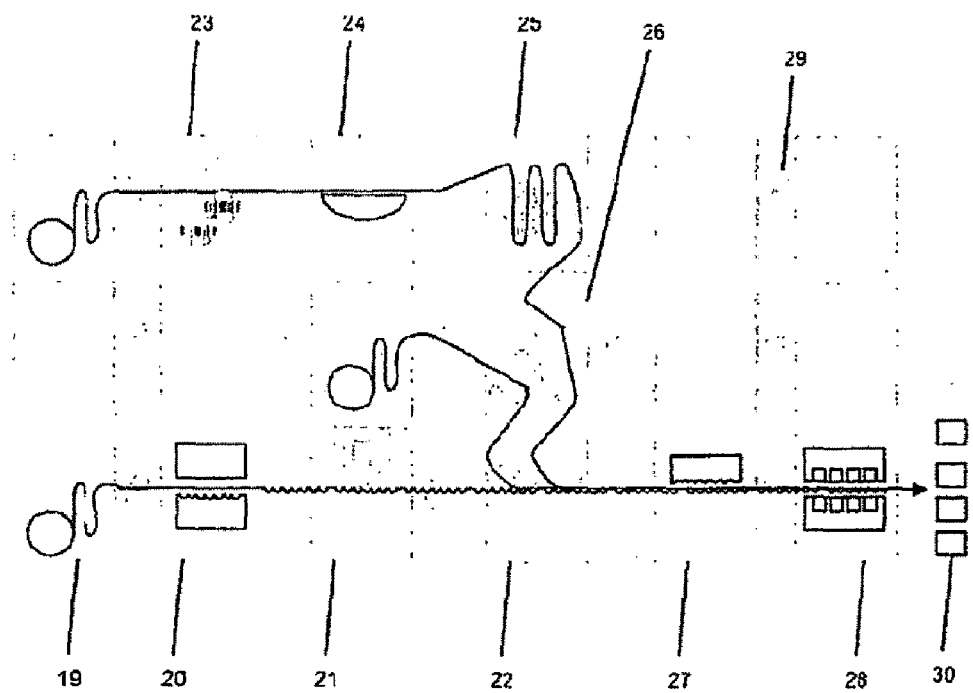
FIG. 3 illustrates an example web production system for blister pack forming.

Any of the modules may have their own independent control and drivers as well as being under the system or another module's control. This includes feedback control systems from different points within the production line. To further explain this, an embodiment comprising a reel-to-reel web production line for forming filling and sealing blister packs is depicted in FIG. 3. In this example, the modular production units depicted are interspersed with material feed handlers (29) and include: forming stock material inputs (19), blister forming (20), filling (21), bonding (22), printing (23), curing (24), tension control (25), material guides and unwinds (26), embossing & perforating (27), die cutting (28), and final part collection (30). Production modules with internal control systems such as the printing unit (23) ensure that their internal processes are optimized, whereas inter-module feedback systems exist to provide optimum connectivity of the different modules to meet the production line requirements. An example of this is the inter-module feedback and control between the tension control (25) and its input from the curing unit (24) and the demands from the bonding module (22).

Figure 4A:
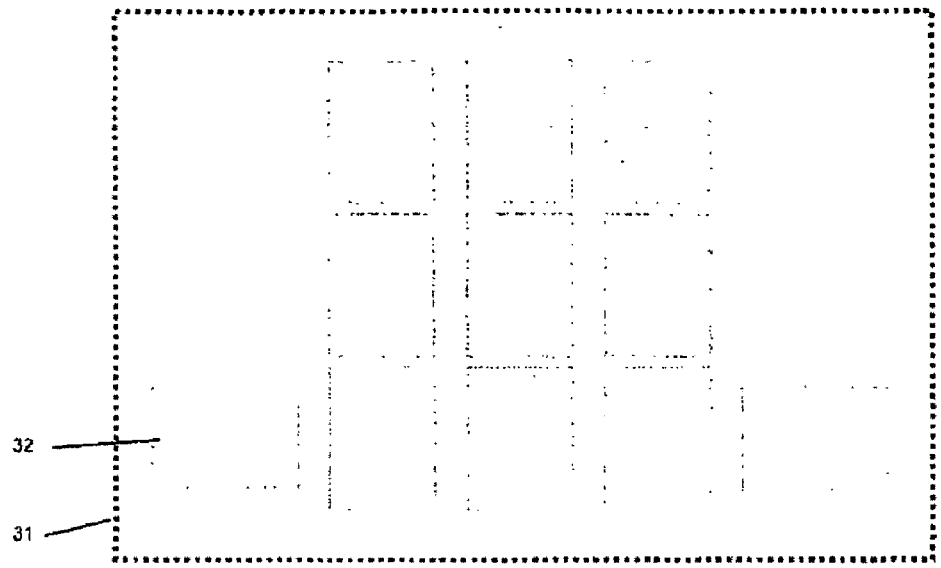
FIG. 4A illustrates a generic production cell with 11 production units.
Figure 4B:
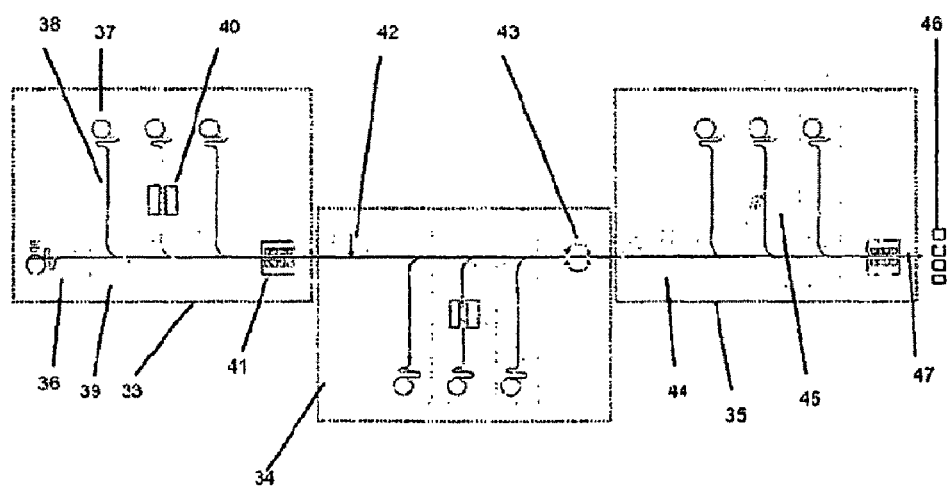
FIG. 4B illustrates three of these production cells, with different modular units, arranged in a single production line for complex multi layered device manufacturing.

The modular, mix and match approach of the invention is further explained with reference to FIGS. 4A and 4B. The operations are divided into separated production cells, or modules, allowing a reconfigurable production line. The system can be configured by altering the interconnectivity between the production cells, or by altering production units within each production cell. In this example, the single common production cell (31) depicted in FIG. 4A contains eleven production units (32) each of which can be configured for one or more production processes. Such flexible processing stations enable multi-product capabilities within the one production line. Although the invention is not limited to production cells of any particular size and/or number, or to using production cells or units of the same type, the implementation illustrated in FIG. 4B shows a production line utilizing three production cells (33,34,35) of the same type, but with different production units. These modular production units might represent one or more production processes such as, but not limited to: sheet or reel loading (36), reel loading and course structuring (37), material handling (38), lamination (39), fine structuring (40), component and adhesive deposition and curing (42), die cutting (41), inversion (43), filling (44), printing (45), and inspection and part collection (46) stations. The modular production units can be interchanged as required depending on the products overall fabrication requirements.

The invention also enables thicker and more complex devices to be fabricated than with standard web-based systems by allowing both sheet and reel stock to be handled on the same line. In FIG. 4B, the input (36) accept both sheet or reel stock and the main web-line (47) can operate using both continuous and discontinuous production materials. Continuous web-based production of multilayer laminates has traditionally required continuous flexible materials to pass through nips and around roller guides. The invention overcomes this limitation by allowing rigid, thicker, and more complex devices to be fabricated by combining web based and discrete component handling techniques in the same production line.

Figure 5:
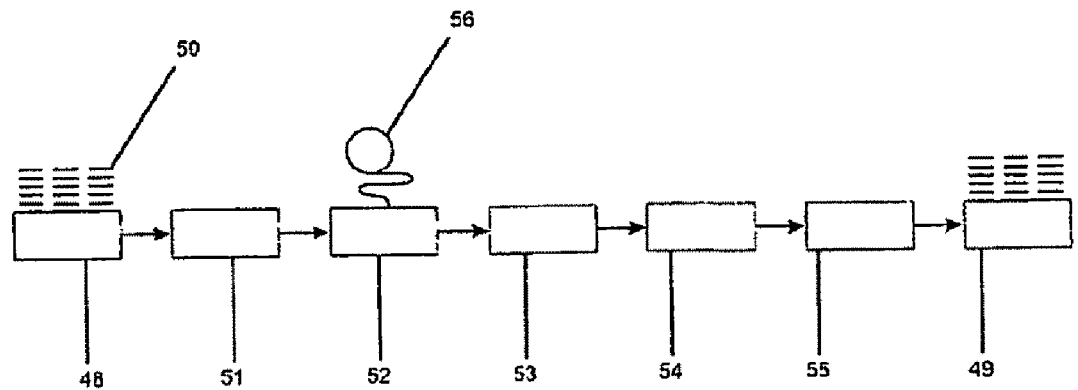
FIG. 5 shows a unidirectional card production line.
Figure 6:
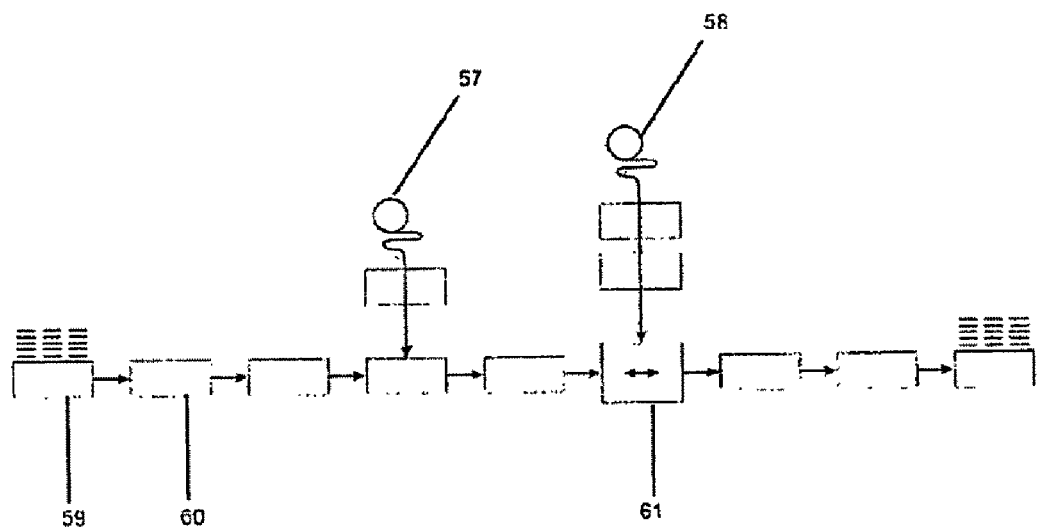
FIG. 6 shows a sheet and reel production line with a multipass module and multiple production arms.
Figure 7:
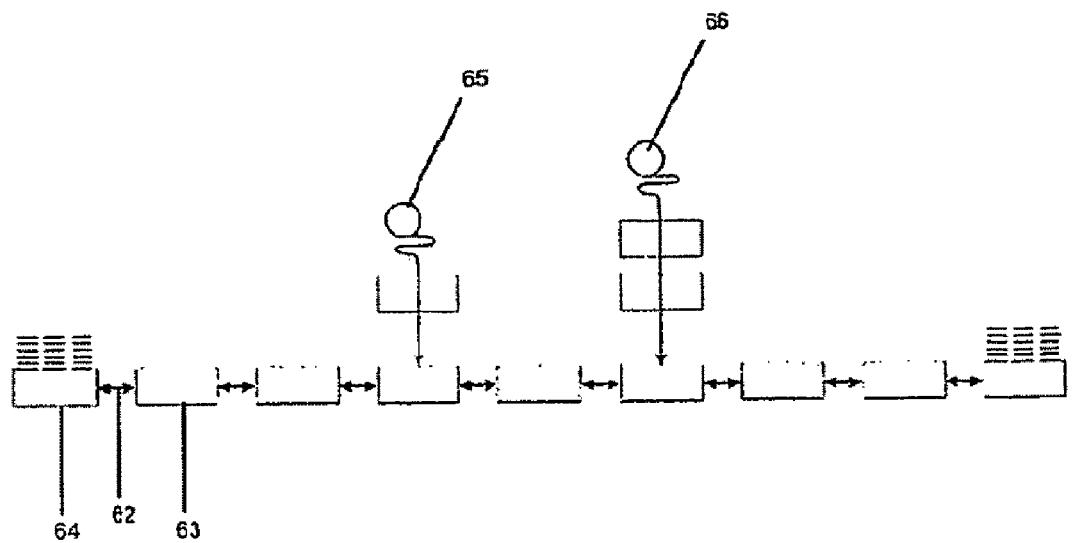
FIG. 7 shows a sheet and reel bi-directional production line.

Referring to FIGS. 5, 6, and 7, sheet and reel components are used for the production of multi-layered card-based devices on continuous production lines. Typical automated card manufacturing and personalization systems operate either a batch or serial production strategy and have been limited to standardized format card handling systems. FIG. 5 depicts a typical card personalization process with input/output hoppers (48,49) and a card handling systems that accept only ID-1 (ISO 7816) format material (50). The processes sequentially operating on the cards include: printing or laser engraving (51), overlay laminating (52) of preformed laminates (56), embossing (53), topping (54), and finally programming or encoding (55). These systems typically use preformed laminates as the cards are of a standard size and customization is not required. The invention allows the use of processing stations (other than just printing) to produce custom laminates, or other components, that come together from different arms of the processing line.

For example, FIG. 6 illustrates a card production process with multiple production arms, and has more than one input feed, of either reels (57,58) or sheets (59), which input undergoes processing at various production modules (60) and are brought together for further processing. In this embodiment, discontinuous card components are laminated with input stock (57,58) that have undergone processing prior to lamination. Furthermore, more complex multilayered devices can be fabricated by this example, where multiple layers may be added to one part by performing multiple laminations at the multipass station (61). Although a degree of flexibility is provided from this multiple-pass lamination unit, each layer is limited in its form by the order of the processing stations at each line. This limitation can be overcome by providing a line design with buffering, or insertion and removal of components between processing stations.

FIG. 7 provides a bi-directional production line (62) allowing a work-piece to travel back and forth to any processing station (63). In this example, the bi-directional line (62) has input/output hoppers (64) at either end with two production arms joining the bi-directional line from reel stock (65,66). This bi-directional processing line approach provides full flexibility but limits the throughput since each processing station may only process or pass one part at a time. Thus, a station in use prevents another part from passing.

Figure 8A:
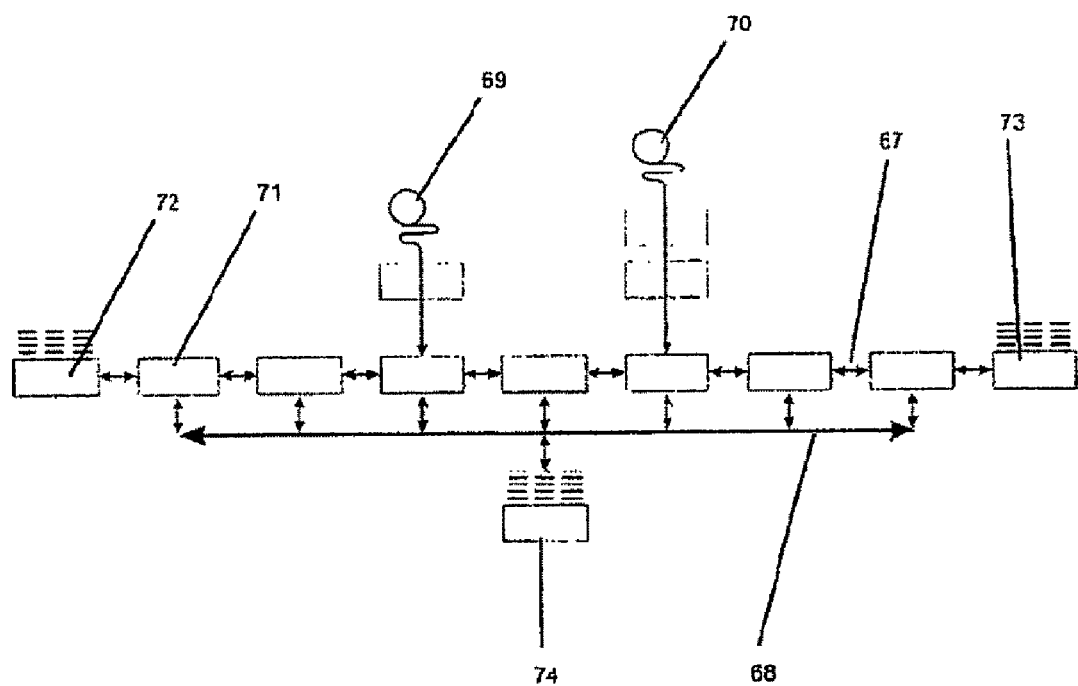
FIG. 8A shows a sheet and reel bi-directional production line with offline transportation stages and buffer storage.

FIG. 8A overcomes this limitation by providing one or more fully reversible, or bi-directional, lines with one or more transportation stages (68) that are separate from the processing line (67) and may move the parts in and out at various stages along the line to maximize the line efficiency. The separate bi-directional line (68) allows parts to pass processing stations that are in use. In the example of FIG. 8A, the production line is similar to FIG. 7 and contains a bi-directional processing line (67), two production arms supplied from reel stock (69,70), processing stations (71), and input/output hoppers (72,73), with the addition of one or more separate bi-directional lines and transportation stages (68) having buffering stations (74).

Figure 8B:
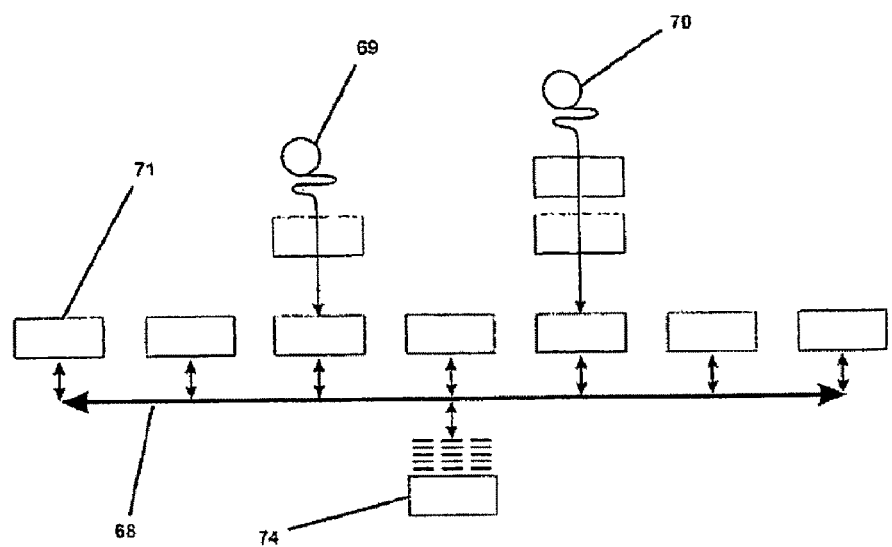
FIG. 8B shows a sheet and reel production line with production modules interfaced to process independent transportation stages.

The example in FIG. 8B is similar to FIG. 8A but without the bi-directional processing line dependent on the processing modules. Instead, the processing stations (71) that were along the processing line are only interfaced to one or more independent bi-directional transportation stages (68), and the buffering stations (74) also act as input/output hoppers. In all of these configurations the use of buffering stations can be used to further improve efficiency between individual processing stations. However, offline buffering is particularly effective in increasing the entire production line efficiency as shown in FIGS. 8A and 8B where the removal, insertion, and storage of partially completed components may be automatically performed at any of the appropriate processing stations.

According to further embodiments, the approach of the present invention allows a flexible robust production line that provides a more thorough testing process and improves quality by facilitating testing at both system and at individual modular levels. Intra-process testing regimes are not subject to limitations of dwell time between stages, as this is no longer a factor in process according to the present invention. Furthermore, manual inspection becomes possible for critical components. The detection and correction of process problems therefore occurs at a stage where, for the most part, raw material losses are minimized.

Another advantage of the present invention over conventional systems is that the separation and independence of the various modules improves design quality by allowing the design process to concentrate on functionality and efficiency for individual modules, and not compromise these attributes for the sake of connectivity. For these same reasons, development and implementation costs are lower and the delivery of new modules and therefore the delivery and implementation of new production lines are both expedited.

Yet another advantage of the present invention is that failure of a single part of the process has a smaller impact on the overall production. If a section or part of the process fails in a traditional web based process then the whole process stops, ie. the entire production ceases. In the process according to the present invention, all stages unaffected by the failure would continue to produce product which would be temporarily stored waiting to be reinserted into the process at the appropriate place. An additional benefit of this feature of the invention is a reduction in wasted material. In current reel to reel or continuous production systems, ceased production because of failure causes most, if not all, material in the entire production line at the time of the failure to be compromised and wasted. This is clearly not the case in the present invention.

Another advantage of the present invention is the ability to arbitrarily and deliberately freeze and store production at a certain penultimate finishing stage in which partially completed product may wait until finished product is required (for example to fill inventory) and the partially completed subcomponents may be reinserted into the production process and perishable or sales specific reagents or components, for instance, could be added before final finishing and packaging. This feature would allow just-in-time production of customer or application specific layered devices with the minimal amount of time, lowest cost and the least amount of additional quality assurance and quality control process.

A further benefit of the present invention is that stages that are not required for final finishing may be reconfigured to produce penultimately finished product for another design of layered device, or may be configured to duplicate slower processes in other production lines in the same facility thereby maximizing the use of capital equipment and improving production efficiency.

Higher overall product throughput is therefore achievable using such a modular approach for facilities which manufacture small runs of multiple products than can be achieved with conventional systems.

Layered device designers may now take advantage of these flexible production features to further improve design and production flexibility, with concomitant cost and marketing advantages, to a stage not previously possible.

A further advantage of the invention is that maintenance and troubleshooting may be performed more easily and quickly, as modules can be replaced easily with minimal disturbance to production, and certain stages may be shut down for maintenance allowing partial device fabrication and storage.

Figure 9A:
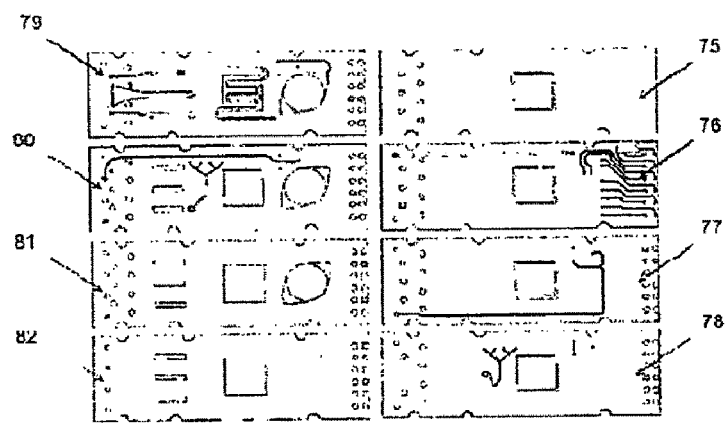
FIG. 9A depicts the individual layers of a layered microfluidic device.
Figure 9B:
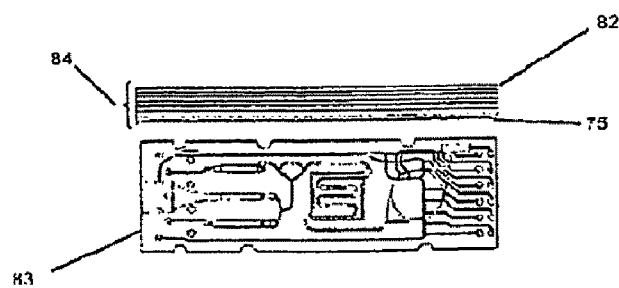
FIG. 9B shows the top and side views of the combined layers of the microfluidic device depicted in FIG. 9A.

FIGS. 9A and 9B show one embodiment of a layered microfluidic device. The individual layers of the device (75, 76,77,78,79,80,81,82) are illustrated in FIG. 9A, with the composite top (83) and side (84) views shown in FIG. 9B. The layers may be fabricated from sheets or reels of continuous material and converted into either sheets by machining or into continuous material by bonding to other layers.

Figure 10:
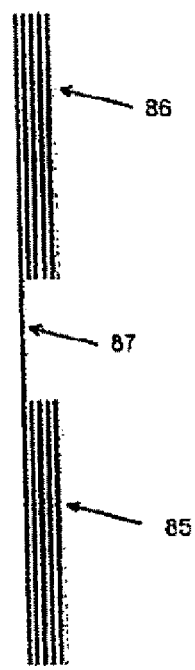
Figure 10B:
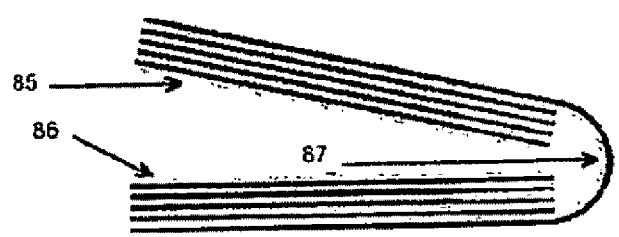
Figure 10C:
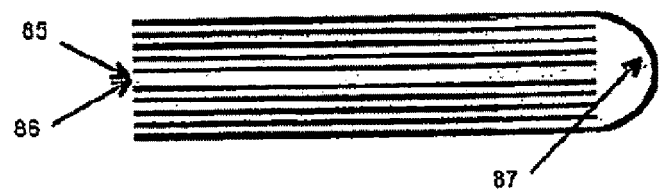

FIG. 10 illustrates a multilayer device that has two multilayer components (85,86) joined by a thin flexible substrate that may be folded along the flexible region (87) to bond the two multilayer components together. Alternatively the device may be a multi-layer, or multi-component device, with at least one flexible folding region. The advantages of fabricating a device or component with a flexible region include:

- Improved connectivity for electrical, optical and similar components as there is less need for lossy and failure prone interconnects or vias.
- Improved alignment between components or production processes where those processes would normally be split over more than one layer. For example, components can be deposited by one process onto the one layer using a single reference point and/or tool, and then the layer is folded to reposition the components on the device.

Matching processing on layers using the same production process. A simple example is the fabrication of holes between layers. If split over several individual layers each process needs to be aligned for each layer. If using a folded approach then a single tool can be used, referencing the holes to one another and providing identical processing parameters.

Reduced production processing by enabling processing on a single layer then folding rather than processing on two or more separate layers.

Simplified handling due to a reduction in the layer count.

In another embodiment of the invention, the structured films are laminated to other components, which may or may not be a continuous substrate, and may or may not be planar, and may be made of single or multiple components. Such components could include batch or serially fabricated parts, single or multi layer parts, individually or tray mounted, as shown in FIGS. 11A-C.

Figure 11A:
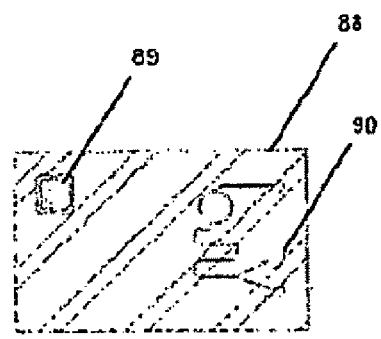
FIGS. 11A-11C show batch or serially fabricated parts, individually or tray mounted.
Figure 11B:
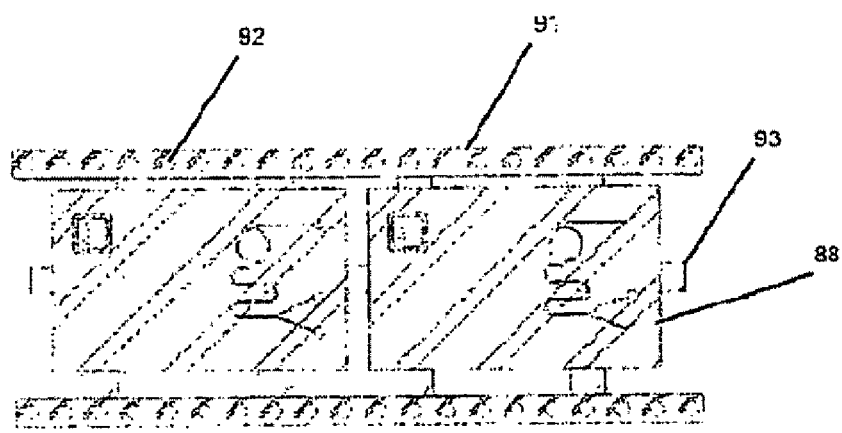
Figure 11C:
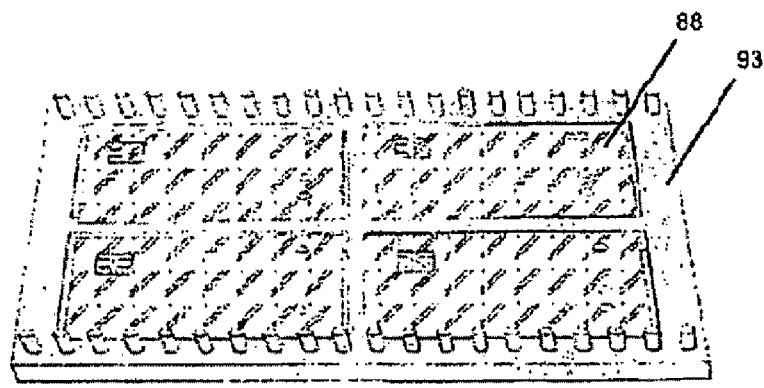

The microfluidic part (88) of FIG. 11A contains an electrode (89) and microfluidic (90) components and is shown in FIG. 11B as part of a larger sheet or web (91) containing multiple parts with alignment holes (92) and sacrificial joining tabs (93). FIG. 11C shows four microfluidic parts (88) mounted in a carrier tray (93A) for passing between processing stations.

According to the present invention layers of material may be attached to other components by various methods. Preformed layers cut to size may be individually bonded to other discrete components (the bonding of individual laminates to discrete components). Preformed layers may be delivered to the discrete components on a carrier layer that has more than one preformed layer, and may be continuous (the bonding of individual laminates on a carrier to discrete components). The layers may be delivered to the discrete parts as a continuous layer with preformed tension points, such as perforations or partially cut material, that separate by an applied force just prior to or at some point after bonding to the discrete part (the bonding of preformed self separating laminates to discrete components). The layers may be delivered to the discrete parts as a continuous layer and cut entirely, or partially through and separated by an applied force, just prior to or during the bonding stage (forming then bonding self separating laminates to discrete components). The layers may be delivered to the discrete parts as a continuous layer and separated from the continuous layer just prior to or during the bonding stage (forming then bonding laminates to discrete components). The layers may be delivered to the discrete parts as a continuous layer that is cut just at some point after bonding to the discrete part (trimming of the continuous layer after bonding to discrete components).

Figures 12, 12A:
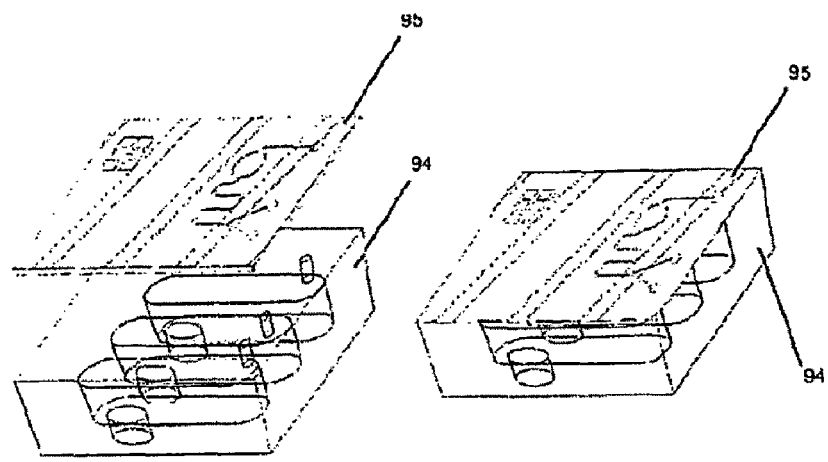
Figure 13A:
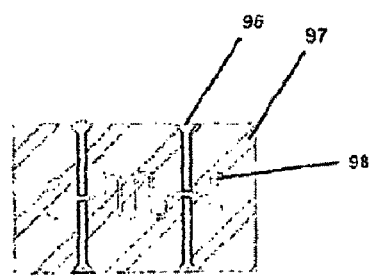
FIG. 13A illustrates a top view of a microfluidic device with waveguide components.
Figure 13B:
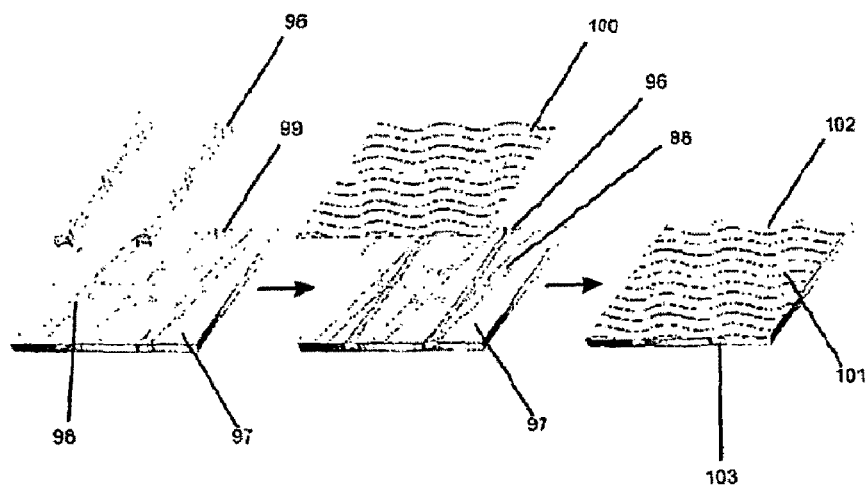
FIG. 13B illustrates the incorporation of separately fabricated waveguide components into a microfluidic device.

FIGS. 12A and 12B show one embodiment in which the sheets may be individual batch or serially fabricated components bonded to the films or other sheets. In this embodiment, a relatively thick injection molded part (94) is bonded to a microfluidic card (95), providing interface and reagent storage. FIGS. 12A and 12B show the two parts before and after assembly, respectively. The addition of serially or batch fabricated parts includes bonding of parts between the layered films as described in the waveguide section for optical component integration. An example of this is illustrated in FIGS. 13A and 13B, where the assembly for the microfluidic device of FIG. 13A, containing preformed waveguides (96) inserted into a substrate (97) containing microfluidic structures (98), is shown in FIG. 13B. The preformed waveguides (96) are placed into locating structures (99) in the substrate (97) adjacent to the microfluidic structures (98). A sealing layer (100) is then used to seal the device providing only inlet ports (101) to the microfluidic structures on the top surface (102) and waveguide input and output through the side ports (103).

Materials used according to the present invention may include non-metallic or metallic films or sheets as structural or heat conductive layers, electromagnetic shielding, or as a part of an integrated component. Structural layers are important to avoid channel sag from a bonding process, which is a major problem in larger microfluidic structures sealed with films, thereby allowing wider channels to be fabricated by this 3-dimensional layering strategy.

Heat conductive layers may provide improved thermal control within the device, which is important for optimising reaction conditions. Electromagnetic (EM) shielding protects the sensors and actuators on the disposable device from Electromagnetic Interference (EMI) and in some cases reduces emissions from chip components or may be used to strengthen EM fields used for some actuators (as with magnetic and paramagnetic particle manipulation).

Other materials may also be incorporated into the products including, but not limited to, paper, nitrocellulose, glass, and fabric based products depending on the application requirements.

Of the micro-fabrication techniques mentioned earlier, the methods of die cutting, laser processing, embossing, thermoforming, and print-head deposition are all techniques that may readily be integrated into a reel-to-reel system. With the process according to the present invention, other fabrication techniques such as injection molding and micromilling may also be incorporated into the manufacturing process.

The macroscopic injection molding process can be adapted for fabricating micro-parts by either employing a variotherm process or using a non-thermal polymerization method such as with UV reaction molding. The difficulties with micro-injection molding are the high pressures and low viscosities required to inject the polymer into the microstructures of the mold cavity. With the decreasing size of the microstructures, the cycle time and difficulty of manufacture are increased. Due to the difficulties of ejecting a component from a mold, fully 3-dimensional microfluidic structures are not feasible with this process alone. Instead, typically multiple structures are aligned and bonded together to achieve buried channels.

In a similar manner to traditional computer numerically controlled (CNC) milling, micro milling employs computer driven milling tools to route a structure. Micro-mills operate at higher tolerances and use smaller drill bits than standard CNC mills (down to 100 µm). This is mostly a 2-2.5D technology as buried channels cannot be fabricated without bonding other parts over the channels.

Die cutting is a process used to stamp out structures entirely through substrate layers. The process involves a tool with defined edges pressing into and piercing a substrate against another surface or matching edge. Typically, the structures achieved by these methods are large by microfluidic standards, rotary cutters are usually limited to structures greater than a millimeter, whereas match platens can achieve dimensions down to 100 µm.

Most of the work to date on laser micromachining has been performed with assistance of ultraviolet lasers, mainly with excimer lasers, which can produce fine anisotropically etched structures down to one micron. Unfortunately such systems are expensive and relatively slow. More recently, focus has been on the use of shorter wavelength UV lasers that can machine channels down to 100 µm, depending on the material thickness. Unfortunately these systems provide a large heat-affected zone that limits microfluidic geometries. In a similar manner near-IR $CO_2$ lasers have been demonstrated for microfluidic channel fabrication for large structures only (in the order of hundreds of microns). The challenge in incorporating these technologies into a web based system relates to the time required for the laser to complete its machining process as well as the morphology of the resulting cut.

Embossing is a technique in which a stamp is pressed into a polymer material to form a replicated structure in the polymer. The replicated structure produced is a negative image of the stamp. Embossing is capable of replicating structures in the submicron domain. However, for larger structures this becomes more difficult as the material shifted when embossed is required to flow to other regions within the bulk material. Problems of material relaxation and stress after the embossing process can cause the replicated structures to deform. This problem is exaggerated for polymer films, which are often orientated and are thinner, more rigid substrates.

The hot embossing process is similar to the standard embossing process except that the temperature of operation is typically close to the material's glass transition temperature and the embossing pressures are lower. As with all embossing techniques the quality of the replicated structures are dependent on several parameters including imprinting pressure, temperature, time and the material properties.

Such embossing techniques typically use flat platens and long residence times to achieve high aspect ratio microstructures, and are generally not applicable to high throughput reel-to-reel systems for these type of structures. U.S. Pat. Nos. 6,375,871 and 6,375,776 overcome this limitation by integrating micro-embossing into reel-to-reel manufacturing systems by extruding a melted resin onto a film prior to embossing the melted material. British Patent GB 9623185.7 discloses a method for using UV-cured epoxies extruded and embossed in a similar manner before curing. Problems with such systems include the limitation of materials suitable, and therefore available bulk and surface properties for the microfluidic device.

Thermoform molding is a method of structuring thermoplastic films by heating the film to the softening point of the plastic and then applying force by vacuum or air pressure against the film to allow it to form against the mold. This technique is typically best suited for structures larger than a couple of hundred micron due to the difficulty in achieving sharp corner radii. Very little work has been done in demonstrating this technique for microfluidics.

Print-head deposition is a method for depositing material by a scanning print-head, such as a syringe, glue gun or inkjet cartridge. These methods include some of the rapid prototyping techniques available, such as stereolithography (SLA), and selective laser sintering (SLS). These rapid prototyping techniques typically have tolerances that are too large for microfluidic applications, however, new adaptations are being developed that can form microfluidic structures. Deposition of adhesive for channel wall formation is described in U.S. Pat. Nos. 6,509,085 and 6,074,725. Lago et al. produced microfluidic channel walls by laser printing. These systems have limitations in terms of the chemical compatibilities of the deposited materials and their permeabilities.

The process according to the present invention combines reel-to-reel processing technology and sheet handling systems in a flexible production strategy to produce components incorporating microstructures for fluid, electrical, and optical control. Such structured devices may be produced by laminating structured films together, and/or laminating films to sheets. The sheets are rigid non-flexible components that may be machined by other processes such as hot embossing and injection molding, and may be arranged as single components or multiple components forming trays.

The films may be structured by processes including, but not limited to, embossing, laser processing, die cutting, or thermoforming. Each of these techniques have there own associated design rules for optimal structuring. These design rules include, but are not limited to, limiting sharp edges, such as sharp corners in fluidic channels, order of processing, and numerous other operational parameters such as speed, temperature, pressure, tension, etc. None of these processes have yet been integrated on a reel-to-reel process for the mass manufacturing of complex microfluidic devices.

For low cost, high throughput manufacturing the following considerations can be used to demonstrate the structuring technologies applicability depending on material type, size, and processing parameters;

Roller cutting is only suitable for very large structures >1000 µm

Match stamp die cutting may be used with complicated tools for large structures >>200 µm Excimer laser processing is relatively slow and is only suitable for very fine quickly ablated structures >1 µm with small total area coverage.

Cheaper direct write IR laser technologies are only suitable for larger structures and where melt zone can be tolerated >>200 µm.

Film embossing is typically best for fine structure replication <10 µm depending on volumes of material displaced Of these techniques, embossing represents the cheapest manufacturing alternative, but is severely limited dimensionally for films, or even bulk materials at high speed. According to one embodiment of the invention, the process combines embossing with other techniques to improve embossing capabilities and overcome some of the limitations of the other structuring methods. This allows embossing of structures of all sizes and improved channel geometries over conventional techniques.

The layering technique for forming 3-dimensional microfluidic devices typically involves layering of gasket shaped films, and producing channel structures that have square or rough edges. Restructuring these edges by embossing allows other geometries for improved hydrodynamic flow and device functionality.

Figure 14:
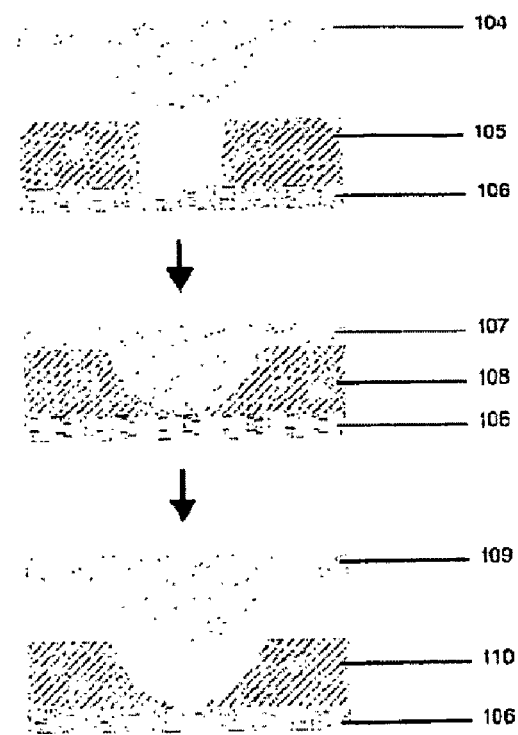
FIG. 14 illustrates embossing of square edges structures.

FIG. 14 illustrates the embossing of a square edge channel to produce a channel geometry with a rounded cross section. In this example the layer with a square edge channel (105) is bonded onto another layer (106), that is more rigid at the embossing temperature, and an embossing tool (107) with a rounded edge is brought to bear on the channel structure. When the tool (109) is mated with the structured layer (108), the softer material forms around the tool structure. Upon separation of the tool (104) the structured layer (110) shows an embossed structured replicate of the tool.

Figure 15:
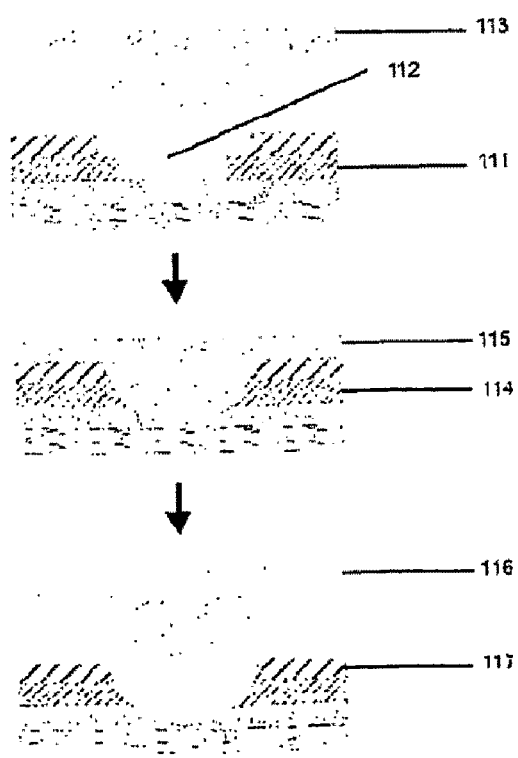
FIG. 15 illustrates embossing large structures with the bulk of the material removed prior to embossing.

In a similar manner, large embossed structures may be formed by removing the bulk of the material inside the structured area, ensuring less material is required to be shifted during the embossing processes. This allows embossing of much larger structures without long stamp residence times or inducing large material stresses. The embodiment of FIG. 15 illustrates the embossing of a multilayer structure (111) where the bulk of the material in the structured area (112) was removed by processes prior to embossing with a tool (113). During embossing, the structured material (114) forms around the tool (115), leaving a formed image of the tool (116) in the structured material (117).

Another advantage of the invention is that the swarf and rough edges produced by the cutting processes, such as laser and die cutting, may also be embossed after structuring to improve channel performance. In these cases the swarf, debris and roughened edges of the machined surfaces can be embossed and reshaped into the bulk structure to provide cleanly structured surfaces.

Figure 16A:
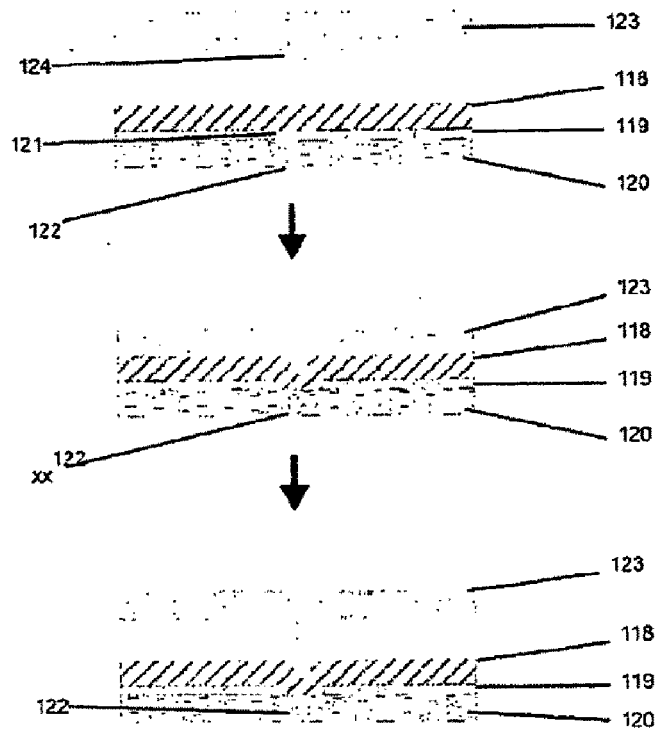
FIG. 16A represents a structuring process where the structure is smaller than the thickness of the embossed layer.
Figure 16B:
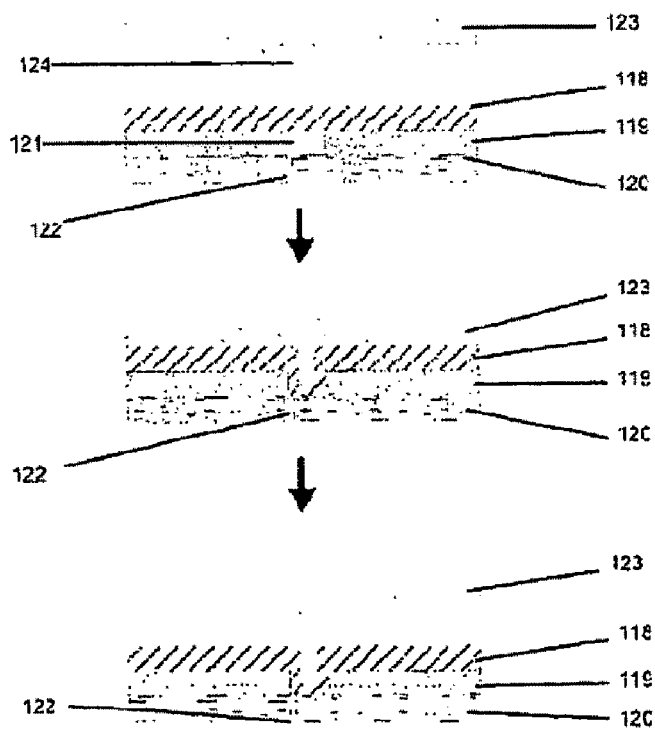
FIG. 16B shows an example where the embossed structure pushes into the void below the embossed layer.

Another process according to the present invention for improving the replication of structures in films is the use of undercut layers below the embossed structure to allow the displaced material to be shifted out of the way rather than into the surrounding bulk material, as illustrated in FIGS. 16A and 16B. The embossed material may have a lower glass transition temperature than the material below with the undercut. The layered components shown in both figures have an embossing layer (118), a layer (119) containing a relief structure (121), or undercut, and a bottom layer (120) with an air vent (122). The volume of undercut (121) may be calculated to match the displaced material to ensure good replication against the mold, and either an air vent (122) or air reservoir may be used to reduce the backpressure in the undercut from the air compression. FIG. 16A represents this structuring process where the structure is smaller than the thickness of the embossed layer, the tool (123) is pressed onto the embossing layer causing the tool structure (124) to embossing part-way through the embossing layer displacing some of the material from layer (118) into the pressure relief structure (121). A similar example is shown in FIG. 16B where the tool structure (124) is taller than the depth of the embossing layer (118), and the resulting embossed structure pushes into the void below the embossed layer.

These methods allow much larger replication of embossed structures than is normally achievable in film-based devices, and particularly those materials that are not entirely amorphous. The process also provides a method for shorter residence times in comparison to normal embossing as only the area in the proximity of the feature needs to be heated to allow reflow. In comparison to the hot embossing process where the entire bulk of the material is required to be heated to allow material flow, or in standard embossing processes where more material is required to be shifted causing larger intrinsic stresses in the material.

Figure 17:
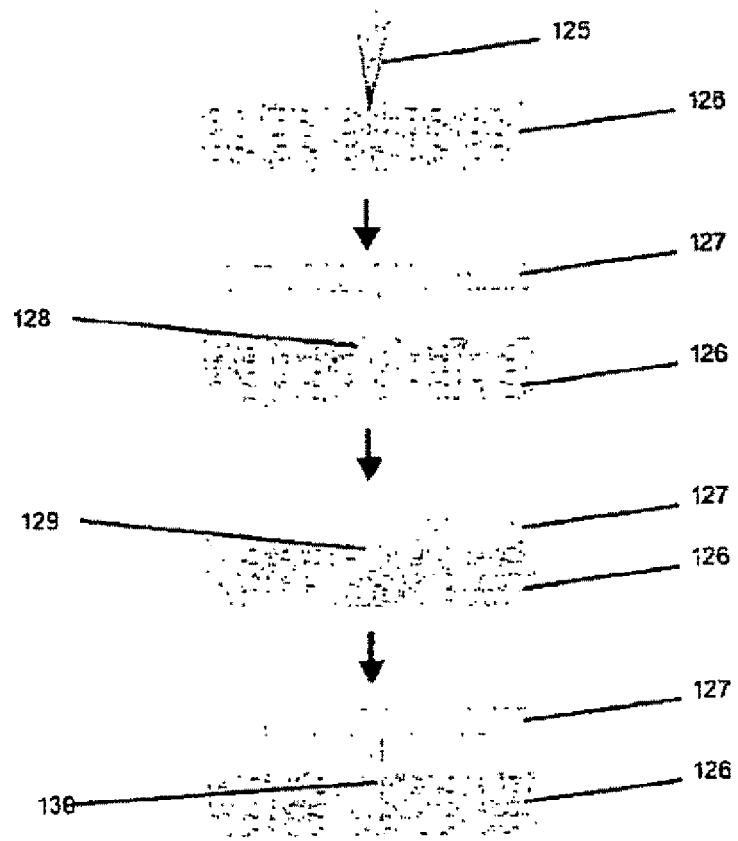
FIG. 17 illustrates combined laser and embossing processes.

The laser embossing process according to the present invention enables more rapid replication of embossed features than by normal and hot embossing. By pre-treating the local area to be embossed with lasers the local material is altered, which allows (a) a reorganisation of the localised material structure and for some polymers lowering of the softening point (as is especially the case with orientated films), (b) preheating of the exposed area, (c) material reflow and (d) in some cases, ablation or material removal from the embossed area. Before stamping the area of the film to be treated, the local area or the tool may be heated to improve the material flow around the tool. The laser beam may expose the entire substrate surface or just the area to be embossed. Automated systems may also be used to guide the laser beam in an appropriate pattern either by computer file direction or from image recognition off the tool or material. FIG. 17 illustrates a focused laser beam (125) scanned over a material (126) prior to embossing with a tool (127) into the exposed area (128). Upon contact with the tool the irradiated material (129) forms around the tool, leaving a structured surface (130) when separated. In a similar manner other material treatments, such as the chemical, corona and UV treatments discussed later, can be used to modify the materials properties near the embossing area to enhance the embossing process.

Such a process allows the use of longer wavelength lasers than the expensive and slower UV excimer systems for fine structure formation. Unlike their excimer counterparts, such longer wavelength systems produce more thermal damage and typically have larger focus spot sizes, which severely limits their spatial resolution for micro-structuring and provides poor cut quality. By combining the laser processing with embossing, finer and more accurately formed micro-structures may be fabricated than with the laser alone, and faster residence times and larger structures may be formed than with embossing alone, thereby providing a much faster and cheaper method than excimer laser processing. A process according to this feature of the invention is also compatible with reel-to-reel systems.

Figure 18A:
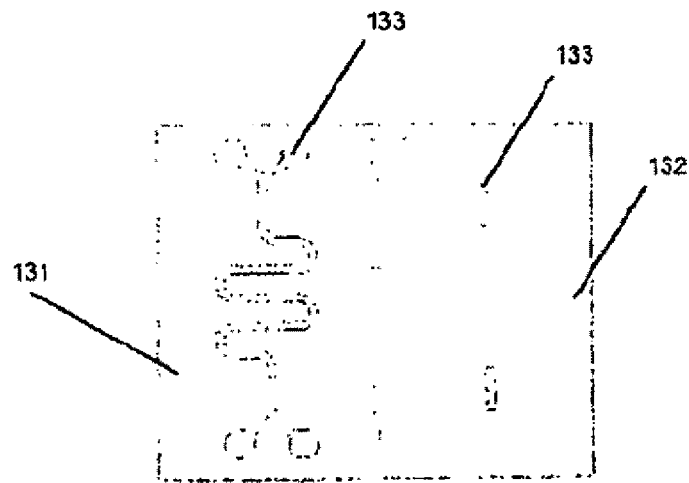
FIGS. 18A-18C show the assembly of a microfluidic structure split over two layers.
Figure 18B:
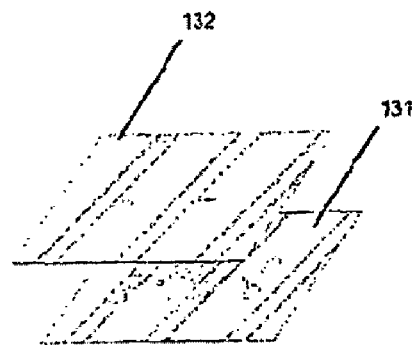
Figure 18C:
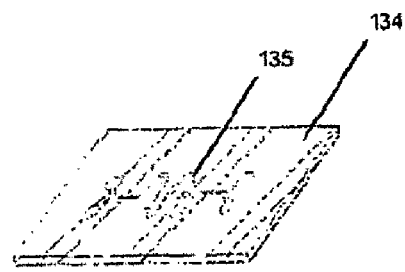

The die stamping approach according to the present invention separates large fluidic structures over multiple layers. This approach allows the implementation of a modular stamping process having a similar form to a "printing press", i.e. a die with modular and interchangeable stamping tools. Without a layered process, discontinuities between each modular stamping tool might provide blockages in formed channels. FIG. 18A illustrates two layers that have been stamped with parts of a fluidic structure (133) over two separate layers (131,132). The first layer shows three discontinuous fluidic elements that can be joined by the layering of the second structured layer. FIGS. 18B and 18C illustrate how these two layers (131,132) may be aligned on top of one another and bonded together to form a single layer (134) with a continuous fluidic structure (135).

Alternatively, a single layer approach may be used if embossed interconnects are made between the holes made from the modular stamping tools.

Furthermore, a layered approach may also be used to avoid misalignment within the structures of a layer due to some geometries providing freedom of movement, as covered in U.S. Patent Application Publication 2002/0112961 A1 for structure geometries having angles substantially greater than 90°.

The lift-off technique is a common technique used in film converting to process (stamp, roller and laser cutting, etc.) the film with its liner layers attached, and then just prior to bonding to remove these liner layers. This method ensures the film is kept clean prior to bonding and can aid in the removal of swarf and other related debris. In laser processing such liner layers may help improve the cut quality by removing any formed ridges and removing the first and last surface affected by lasering. It is at these boundary layers where the heat conduction is essentially 2-dimensional, as the cut deepens and the laser enters the bulk of the substrate, the heat conduction becomes essentially 3-dimensional, giving a smaller heat affected zone. Bonding the substrate, or substrates, liner layer to a relatively large surface may provide further heat conduction and ease of waste removal for improved processing.

Figure 19:
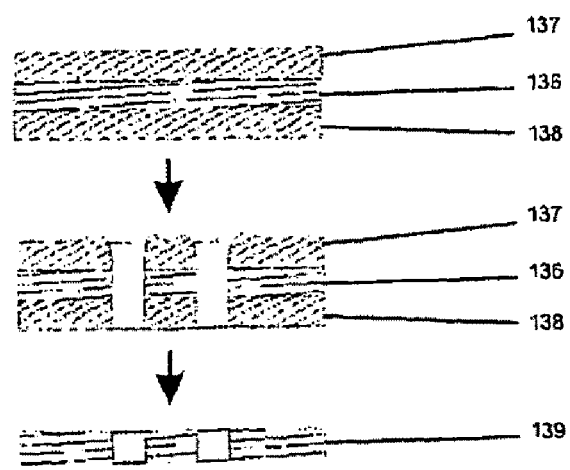
FIG. 19 illustrates the lift-off technique applied to a single layer with two sacrificial liner layers.

FIG. 19 illustrates an example of the use of the lift-off technique during a laser structuring process. The substrate to be machined (136) is bonded to one or more sacrificial layers (137, 138), machining is performed, and the sacrificial layers are removed leaving the cleanly structured substrate (139). Furthermore, this technique may be used to provide contact masking of a substrate to allow the patterned exposure of the substrate to other processes as described in this invention.

Figure 20A:
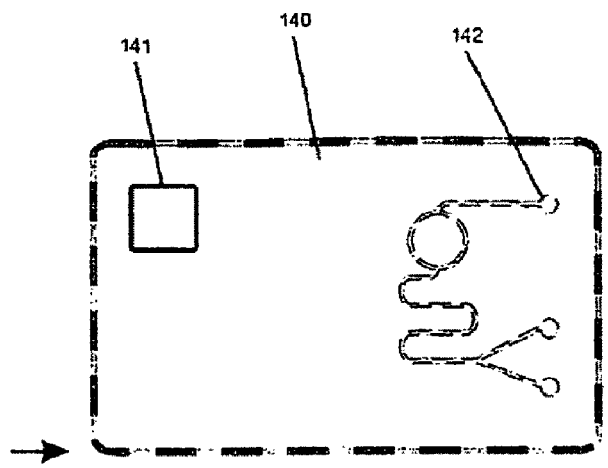
FIGS. 20A-20D illustrate the use of double sided machining with partial patterns.
Figure 20B:
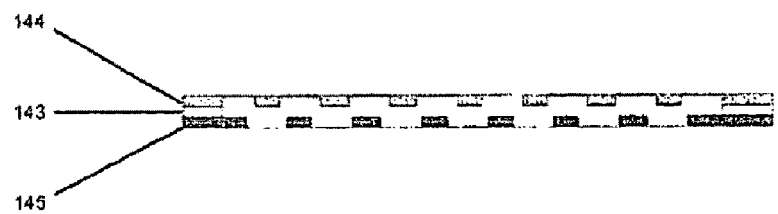

The automated application and use of protective, carrier, and or masking layers to a material can be provided for by the invention. To overcome the limitations of material handling for the removal of the aforementioned layers, the invention employs double-sided processing using split patterns. Processing a material from more than one side using different parts of a single pattern can provide careful control over material cut-outs and discontinuities. By controlling the amount of material attached in each cut out area on each layer, the material in a cut-out area can be removed with the removal of one or more layers. For example, the pattern of FIG. 20A provides three cut-outs areas (140, 141, 142). If a material was entirely machined through with this pattern then all these cut-outs would be unsupported. Furthermore, the outer layers would then be discontinuous, making the removal of sacrificial layers or waste areas problematic above the cut-outs or discontinuities. If the entire pattern were machined through a layer of the multilayered device, then the subsequent removal of the outer layer would not remove the entire patterned area. By providing outer sacrificial layers and machining from both sides with a discontinuous pattern then selected layers can be removed entirely and still provide a completely machined internal layer (143). As can be seen with the cross section shown in FIG. 20B, the two outer layers (144, 145) are only partially machined and the center layer (143) is completely cut through along the machined pattern.

Figure 20C:
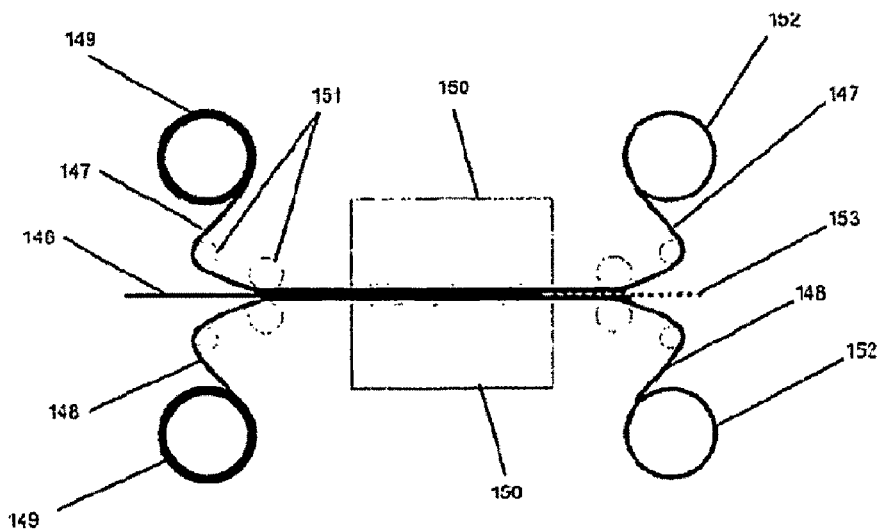

Double sided processing can occur at separate processing stations on either side of the material, or the material may be flipped and passed through stations on the same side. In one embodiment of the invention, shown in FIG. 20C, material handling rollers (151) are used to manipulate the sheet and reel materials allowing the substrate material (146) to be reversibly bonded to two protective layers (147, 148) fed from reels (149) onto the substrate's (146) top and bottom surfaces prior to structuring by the stations (150). After processing at one or more stations (150, 151) the protective layers (147, 148), with their cut-out zones attached (140, 141, 142) are then removed by the unwind reels (152), leaving the discrete parts (153).

Figure 20D:
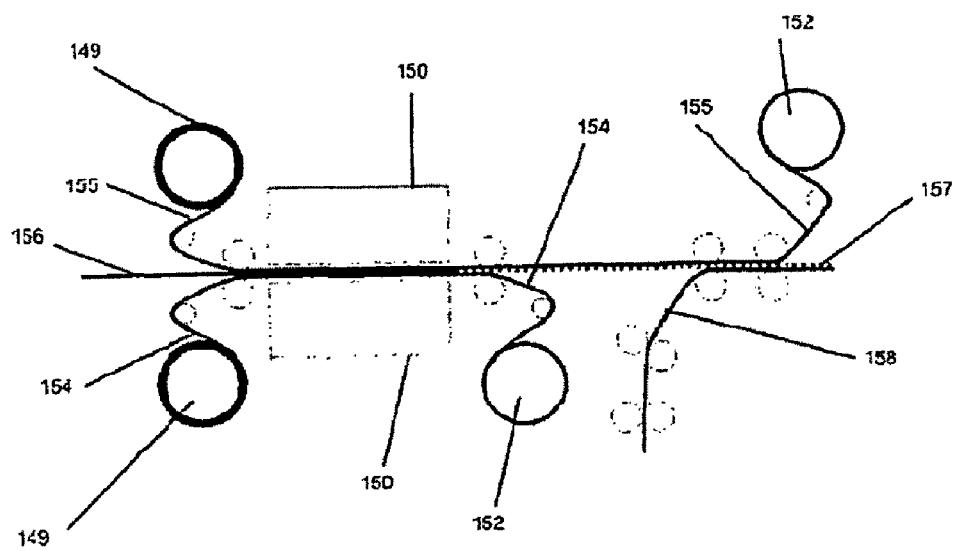

In another embodiment of the invention, a material is processed into smaller discrete components but handled as a continuous material attached to one or more carrier layers or parts. Referring to FIG. 20D, only one protective layer (154) is removed to allow the continuous handling of the material and bonding onto a new component or carrier layer (158), then the second sacrificial layer (155) is removed. With the result leaving cleanly processed parts (157) having their cut-outs removed, and bonded a new component or carrier layer (158).

Other techniques that may be combined, or used separately, with the aforementioned methods to improve the cut quality and remove debris include:
Oven heating
Flash heating
Laser scanning (lower energy or faster scan rate to clean rather than etch substrates)
Air jets
Chemical baths
Mechanical knives Conductive circuits on polymer substrates are usually made via etching, screen printing, or electroplating processes.

Etching is used in the printed circuit board (PCB) industry for the manufacture of flexible electronic circuits. Typically, copper coated polyimide is coated in photoresist, which is then patterned and the resulting pattern is then etched away chemically. The main disadvantages of this method are the limited material types of the substrate and conductor available.

Printing is easily implemented in production, has low tooling costs, and allows a reasonably wide range of materials to be used. Printing technologies include channel filling, contact mask, screen printing, flexography, gravure and printing. Issues to be considered with the process include the limited material thicknesses (<25 µm) and inability to solder to the resultant electrodes.

Electroplating or electroless plating is more difficult to implement in production, but enables excellent control of spatial resolution (>10 µm) and can be plated to almost any thickness depending on the exposure time, and is well established in the PCB industry. Methods of forming seed layers include wet chemical priming and plating, laser ablation deposition, ebeam evaporators, physical vapor deposition (PVD) and chemical vapor deposition (CVD) techniques.

The process according to the present invention uses layers of structured polymer films and sheets to form sophisticated fluid handling devices. In those embodiments which relate to the use of electrodes within these devices it becomes necessary to provide techniques for providing interconnection between the internal and external electrodes, which may require vias through various layers and interconnections between layers.

Interconnects and vias in polymer films have been extensively developed for the flexible PCB industry in which through-hole electroplating and riveting are used to provide connection through and between each layer. See, for example, U.S. Patent Application Publication 2001/0047880 A1. Through hole electroplating enables fine tolerances to be achieved and riveting provides robust interconnects. However, in comparison to electroplating the spatial resolution of riveting is poor and buried vias are difficult to achieve. Both of these techniques are slow and cumbersome for high throughput reel-to-reel or continuous production systems.

In the process according to the present invention, films incorporating electroplated tracks and/or vias may be used. However, printing methods for electrical track and via deposition are also used where appropriate as they represent a cheaper higher throughput method of fabrication. Any suitable methods of printing electrodes may be used in conjunction with the present invention. They are often performed for fabricating membrane keypads and electrode sensors (such as diabetic test strips), techniques include gravure, flexographic, contact and contactless screen-printing. Another method used for electrode formation is deposition of conductive material in recessed channels, as described in, for example, U.S. Pat. No. 6,103,033. The process according to the present invention makes use of any of these techniques for electrical track formation, and forms vias, other than those electroplated, by filling in holes within the layered substrates.

Figure 21:
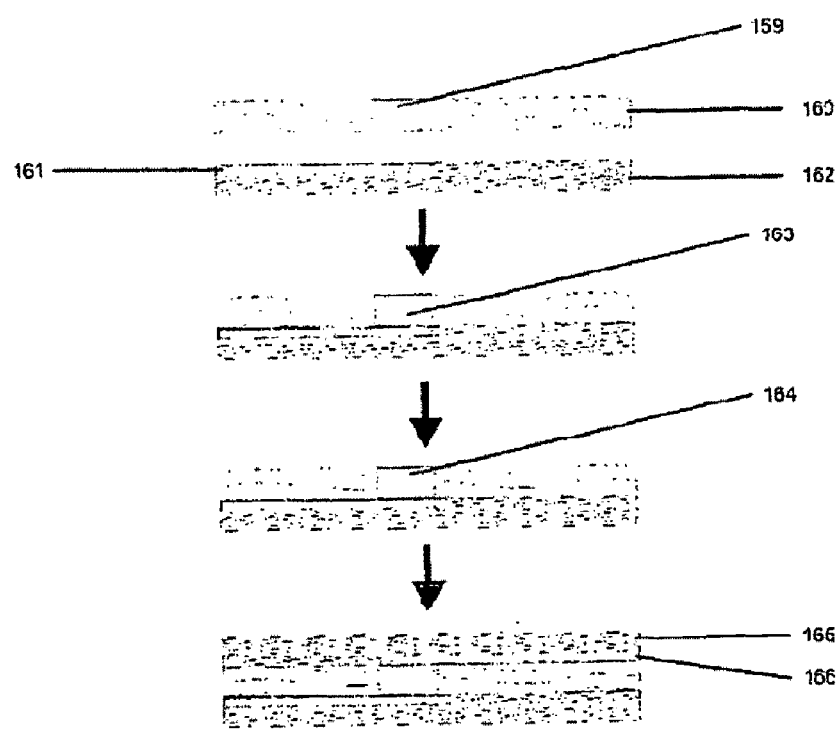
FIG. 21 illustrates via formation in a multilayer structure.

An example of this process for the fabrication of buried vias and electrical contacts is shown in FIG. 21. A hole (159) is formed in a substrate (160) and the substrate is bonded to another substrate (162), which has an electrical contact (161) in proximity to the hole in the bonded substrate (163), the recessed hole is then filled with a conductive material (164), and finally another substrate (165) with an electrical contact (166) is bonded on the opposite side of the via to join the two electrical contacts (161,166) via the filled hole. With this process, multiple layers may be built up layer-by-layer and interconnecting tracks may be joined at the opposing ends. Methods for filling in channels include screen-printing and doctor blade filling, as has been demonstrated for radio frequency identification device (RFID) and sensor production. See, for example, U.S. Patent Application Publication 2005/0072595 A1 and U.S. Pat. No. 6,103,033, respectively.

Another issue in electrical and sensor design for low-level signal acquisition and electrochemical electrodes is to provide reliable and robust electrical connections. In the normal electrical systems to date the main concern is the connector design between each electrical module. In layered electrical and sensor systems the internal interconnects within the components are also of critical importance. In the PCB industry, electroplated vias and soldering are established methods. For layered polymer devices where these techniques may be unsuitable due to material temperature requirements or processing parameters there is still a need to develop reliable electrical connections between polymer layers. In the process according to the present invention, metallic interdiffusion is one of the tools used to effect electrical bonding. By using compatible soft metals, bonded together on opposing layers, a permanent and continuos bond may be achieved.

Figure 22:
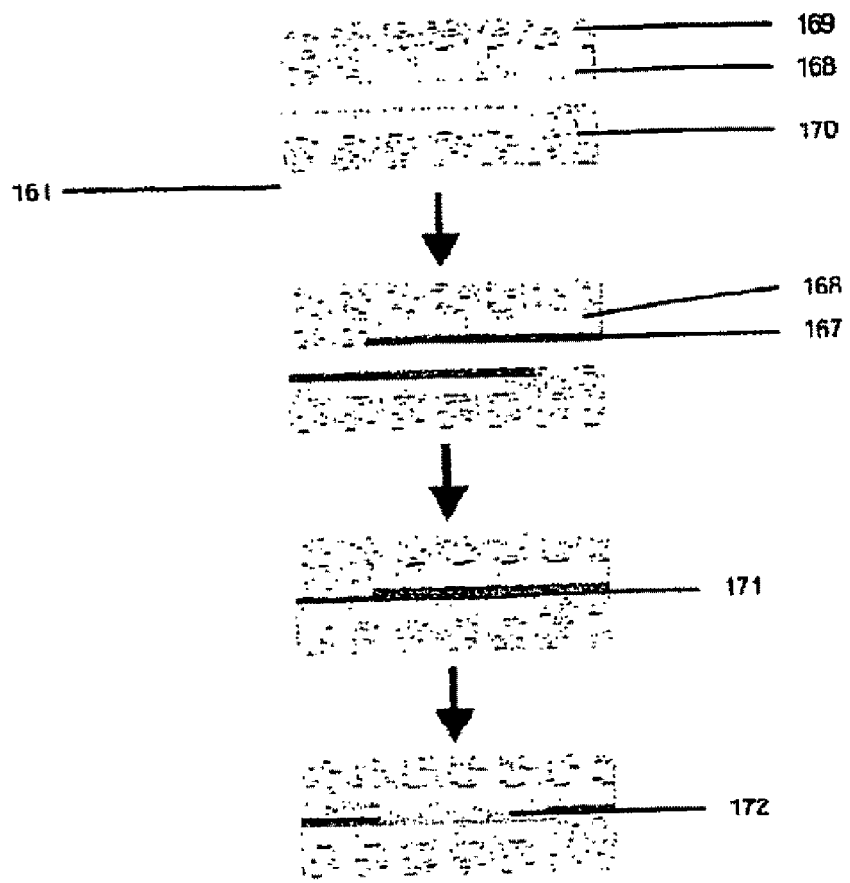
FIG. 22 illustrates interconnect formation due to diffusion between laminated layers.

An example of this is illustrated in FIG. 22, where soft gold electrodes (167) are patterned, either directly on a layer (169, 170) or over the top of other conductive materials (168), on opposing surfaces (169, 170) and then bonded together with the electrodes overlapping (171) and in physical contact. Over a short period of time, hours to days, the gold from either layers diffuse into one another creating a continuous bond (172). In another embodiment, the soft gold may be deposited on top of another material, such as carbon or silver electrodes, and these gold-coated electrical tracks are then brought together.

Such an interconnect method allows bonding between layers of layered electrical components, and bonding between these devices and integrated electrical circuits, actuators, or sensors, as, for example, in smart card integration.

In a similar manner to this interdiffusion technique between conductors, printed methods of electrode interconnects may be formed. As an example, printing silver or carbon-based ink electrodes on opposite substrates and then bringing the substrates together before the inks are fully dry may improve conductivity and bond strength where the electrodes overlap.

Figure 23:
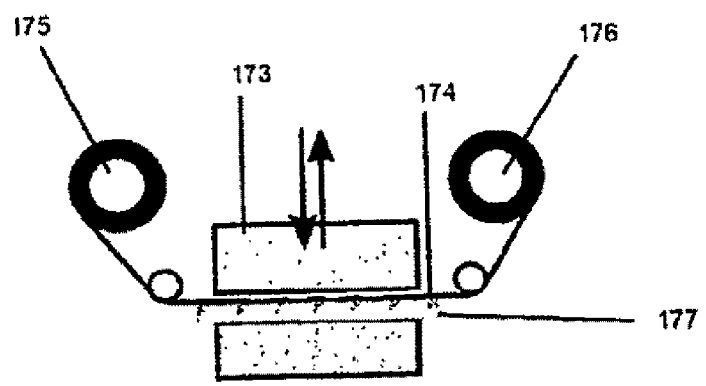
FIG. 23 illustrates a hot foil stamping configuration.

The hot foil stamping method may be used to transfer a thin film, such as a metallic or graphic layer, from a carrier layer onto a substrate. The process involves bonding of the deposited layer onto the substrate by temperature and pressure, which also induces the release of a coating from the carrier tape. The stamping foil often used involves deposition of metallic layers for decorative coatings. These metallic layers are typically produced on carrier tapes, such as polyester, with a wax release that melts at the stamping temperature. FIG. 23 illustrates a heated die (173) pressing a foil (174) transferred between two rollers (175,176) onto the substrate (177) surface transferring a matching pattern of the die from the release layer onto the substrates surface.

For electrode formation where a thicker conductive layer is required, then the stamped layer can be used as a seed layer from which to plate. This simplifies the traditional plating process that requires a mask and physical vapor deposition (PVD)/chemical vapor deposition (CVD) processes, which can be difficult to implement in a continuous production line.

Figure 40A:
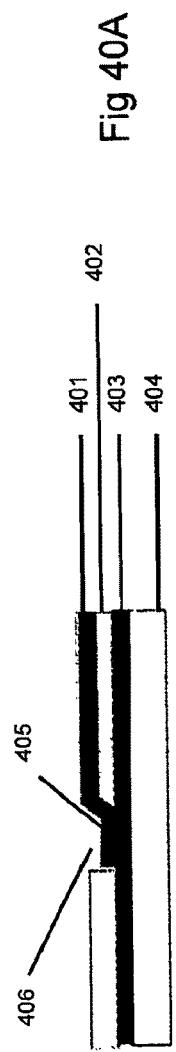
FIGS. 40A-40D show cross sections of a multilayer circuit fabricated by stamping methods.
Figure 40B:
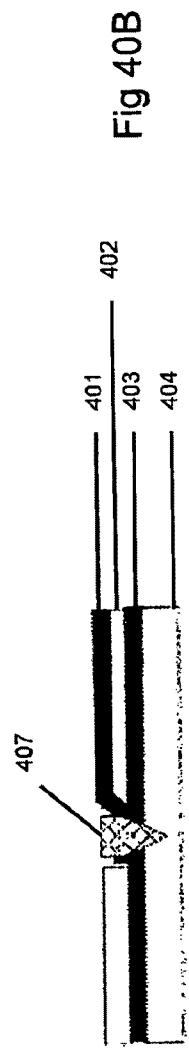
Figure 40C:
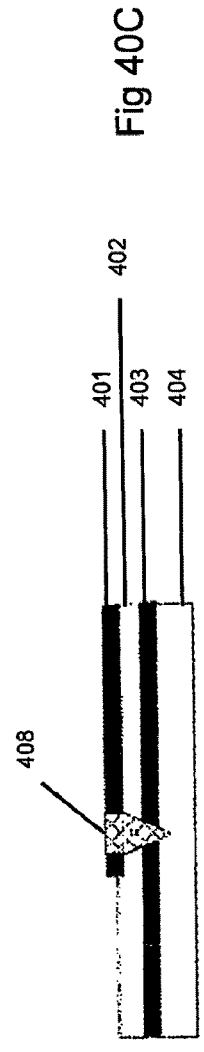
Figure 40D:
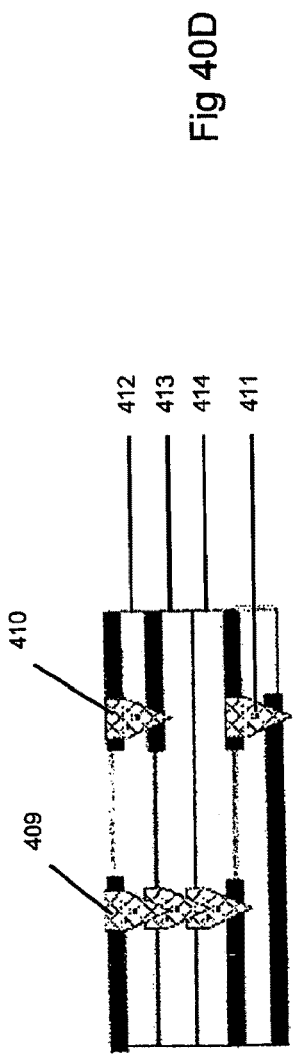

In one embodiment multi-layer printed circuits are fabricated by stamping conductive material onto a substrate and then overlaying a non-conductive material over the stamped conductive material. In this manner many layers of conductive material may be overlain. Interconnects and vias between the conductive layers can be made by either providing areas with no non-conductive material, so that the conductive areas join, or stamping a conductive material through the non-conductive layers to contact the conductive layer below. For example, the cross sections of FIGS. 40A-40D show example cross section segments of multi-layer stamped circuits. FIG. 40A shows a cross section of a two layer circuit formed from two conductive (401, 403) and two non-conductive (402, 404) layers, with an interconnect (405) formed in a region (406) where there is no non-conductive layer (402) and the conductive layers (401, 403) overlap. The opening in the non-conductive material may be produced by any suitable method before or after bonding to the stamped circuit. For example, the non-conductive material can be selectively removed after bonding by laser cutting using a laser that will selectively etch non-conductive material and leave the conductive material untouched. FIG. 40B shows the same interconnect as FIG. 40A. However, in this embodiment, a conductive material (407), either part of layer (401) or another piece of conductive material, is stamped into the bottom conductive layer (403) to form a robust interconnect. FIG. 40C shows no opening in the non-conductive layer (402). However, the conductive material (408) is stamped through the non-conductive layer (402) to provide an electrical interconnect between the conductive layers (401, 403). FIG. 40D shows a cross section segment of a multi-layer circuit containing three stamped interconnects (409, 410, 411) in which one interconnect (409) passes though the non-conductive layers (412, 413, 414). These multi-layer interconnects may be performed with one stamping action which perforates all three layers or by multiple overlapping stamping actions performed on different layers.

Figure 41A:
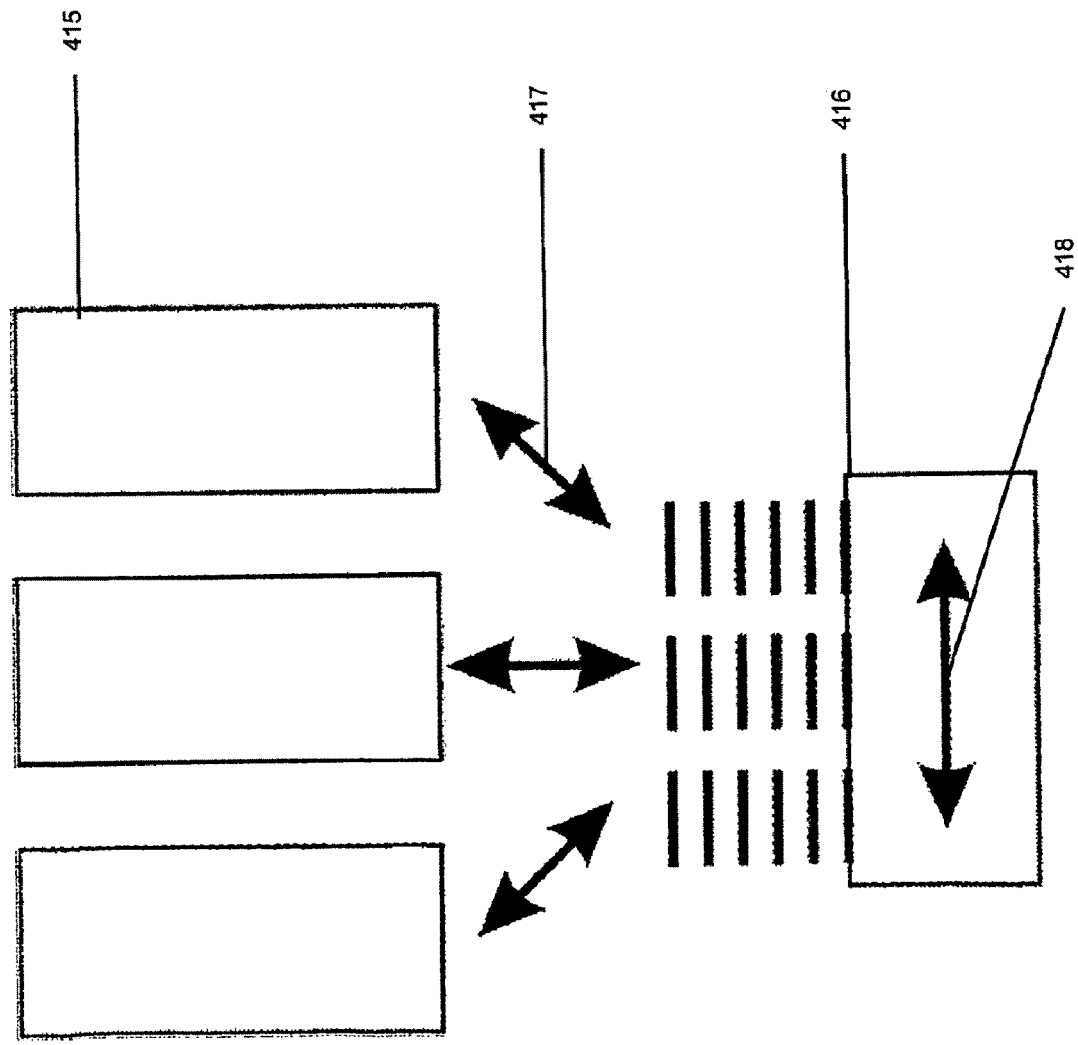
FIGS. 41A-41C illustrate examples of production lines for the manufacture of circuits by stamping methods.
Figure 41B:
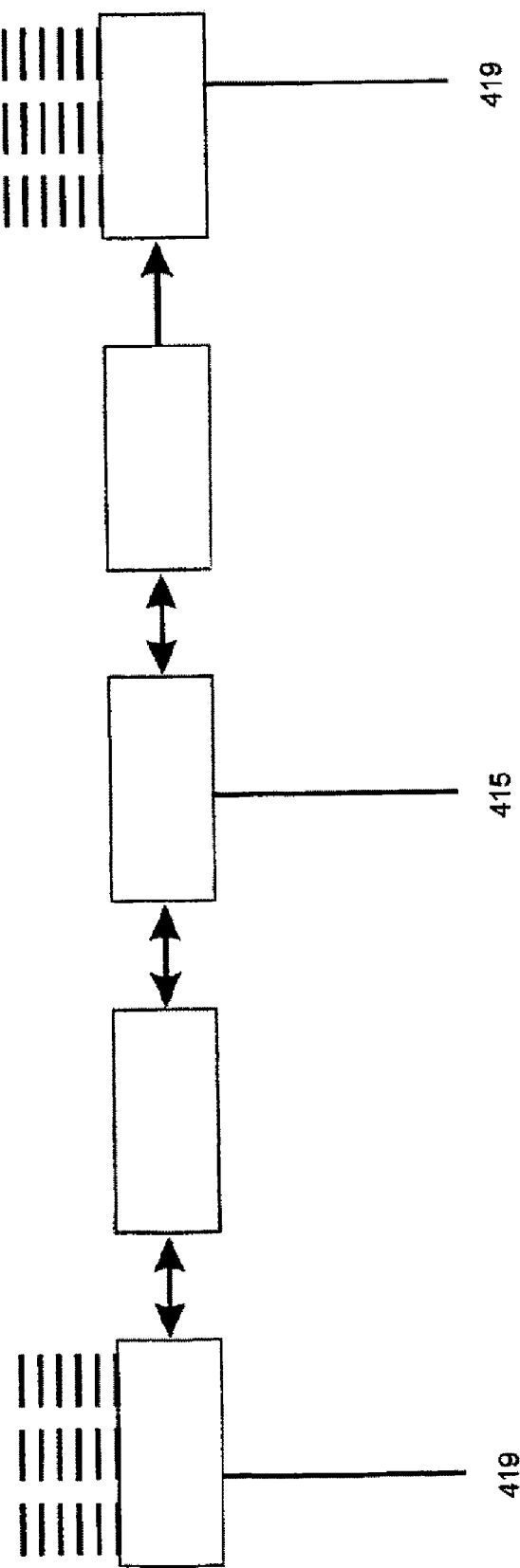
Figure 41C:
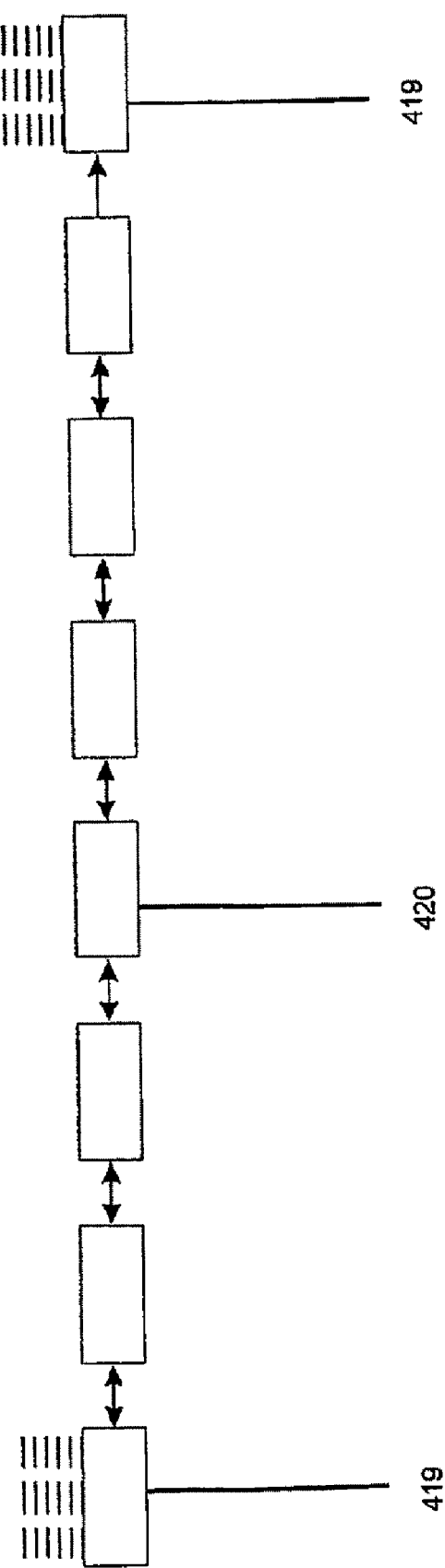

Example embodiments of production lines containing processing stations for multi-layer circuit manufacture are shown in FIGS. 41A-41C. FIG. 41A illustrates a buffering station (416) interfaced directly to three processing stations (415), which might for example include lamination, laser etching, and stamping. In this example the buffering station provides for movement of parts to and from (417) the processing stations and between the internal buffering modules (418). FIG. 41B shows a bi-directional production line with the same processing stations aligned sequentially and having input and output hoppers (419). FIG. 41C is a similar bi-directional production line as that shown in FIG. 41B and has more processing stations (420), which may include: printing, for printing solder, conductive adhesive and resistive inks; component deposition for placing electronic components; and a curing station for curing the solder or conductive adhesive. In production lines which comprise resistive ink deposition then the laser can also be used to trim the deposited films to attain a deposited film specification, such as resistive value.

Deposition of biological and chemical reagents into devices is performed in some cases for sensor fabrication, as with DNA and protein microarrays, and protocol automation where reagents are pre-loaded into cartridges. Techniques for chemical deposition include:

Microspotting (contact or non-contact printing);
Screen printing;
Syringe or jet delivery;
Photo-lithographically activated cross-linking;
Flushing and adhesion or reaction onto pre-activated spots/areas;
Bath immersion;
Robotic placement of dried reagents.

The reagents may be delivered onto surfaces or into structured devices such as wells, bags, and other containers before further processing and sealing. In the case of syringe delivery, needles may perforate layers of material to inject the reagents into sealed chambers. In some cases heating or UV exposure are also required after deposition to fully or partially dry or modify the deposited materials.

Standard surface mount technology, for IC placement and bonding, typically places individual electronic components onto PCB's using robotic pick and place machines, glue/solder deposition and curing stations. In some cases where devices cannot undergo the normal soldering process UV cured conductive epoxies or other conductive adhesives (such as PSA tapes) may be used.

All the methods discussed above may be used with the process according to the present invention for component deposition. Providing methods for material deposition during the process according to the present invention enables either surface deposition or full or partial encapsulation of the component within the fabricated device in a continuos rather than a batch based manner. Integration of the deposition step in the production line allows a higher degree of process automation and helps to minimize the final device cost. Component encapsulation provides a further degree of component protection, such as with fluid samples where it is often necessary to minimize evaporation and protect from contamination.

Other methods of printing are also suitable for chemical and biological deposition. These include gravure or flexographic printing.

FIGS. 24A and 24B show bonding to smart card electrodes and other electrical sensors and circuits through laminated tracks, and interdiffusion or the use of conductive adhesives. Contact smart card electrode modules are shown as an example, but equally applicable are contactless smart card modules, where the electrode module is entirely inside the device rather than exposed on one surface. An example of bonding to a smart card electrode module to allow electrical connections to other regions of a polymer device is shown. In this example, FIG. 24A illustrates the top view of such a card and FIG. 24B illustrates the cross sectional view through the electrode module before and after the bonding of the two electrodes layers. The electrodes (178) connecting other parts of the card (179) can be electrically connected to the electrode module (180) by overlapping the electrode pads from opposing layers. In this example, electrical connections (178) formed on the lower surface of a substrate are bonded onto the electrical pads (181) of the smart card electrical module. The bonded electrode pads (181) may cover only part of the pads from the electrode module (180), as shown in FIGS. 24A and 24B, or they may completely cover the electrode module by the bonded electrodes or a laminate layer to provide environmental protection.

Index holes or marks are commonly used on reel-to-reel processes, such as with photographic films, to provide accurate spatial control of the substrate. The use of alignment marks to accurately align more than one layer is widely used in many industries to ensure accuracy and reproducibility of components and devices.

The aligning of layered devices in microfluidic presents particular challenges due to the small dimensions (μm) of the structures. Two approaches may be used to help reduce failure rates of devices through misalignment and improve quality. First, alignment marks may be used to provide inspection systems with a method for determining the alignment of the layered components, and second the structures may be improved to make them less dependent on their alignment.

The use of alignment marks is almost a common approach used for alignment in micro electro-mechanical systems (MEMS).

Where possible, products are designed for manufacturability, including providing features that minimize difficult to achieve tolerance requirements. Examples of this are shown in U.S. Pat. No. 6,322,683, in which to cope with slight misalignment, wells are etched into a substrate that are larger than the ports interfacing to them. Similarly, in U.S. Patent Application Publication 2004/0018115 A1, channels and wells are formed in the detection region larger than the detector, or along the axis where the largest error for alignment is likely to occur.

One embodiment of the process according to the present invention uses control systems, as discussed above, to facilitate alignment and provide quality control. Parameters in the control system loop include, but are not limited to, optical sensor feedback with film/sheet tension and speed adjustment to improve alignment.

Any feature with an edge defined with a resolution at least as high as the alignment resolution that is sought to be achieved may be used as a detection feature. Sensor systems for detecting such features may employ one or more discrete sensors for either single location detection or area imaging. Image recognition and or other detection algorithms may be used. For micro-features measured optically, this requires a reasonably high definition image in the appropriate focus region. Pattern recognition, including interference patterns, such as moire patterns, diffraction patterns, and projected images from the micro-features may all be used to help improve optical sensor imaging.

According to another embodiment of the present invention, diffraction patterns produced from marks on various layers producing slits are used. As the alignment changes, the slit width changes, and hence the diffraction pattern produced from illumination by an external light source differs. Referring to FIGS. 25A and 25B, each black square represents a mark on a different layer. As illustrated in FIG. 25A, the misalignment of the black marks (182, 183), and therefore the layers, produces a change in their spacing. The change in spacing can be taken from more than one direction, for example, the spacing between the long (182) and small black marks (183) indicates the alignment in the direction perpendicular to the spacing between the small black marks (183). FIG. 25B illustrates the diffraction (187) of a light beam (184) diffracted by the slit (185) producing a diffraction pattern (186). An illustration of the diffraction pattern (188) produced from the illumination (190) of the alignment marks (189) of FIG. 25A is shown in FIG. 26. Only the diffraction pattern along one axis is shown for simplicity, but other axes may be used in conjunction to indicate the relative misalignments in each direction.

Figure 27:
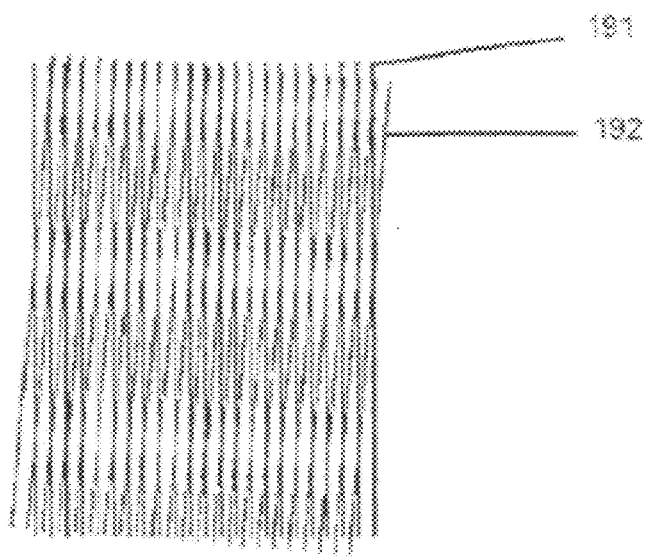
FIG. 27 shows a moire pattern formed from parallel lines.
Figure 28:
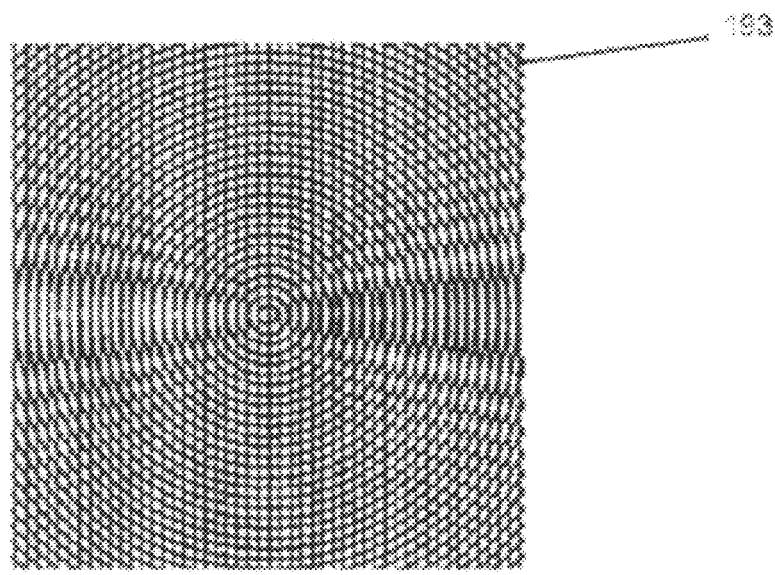
FIG. 28 shows a moire pattern formed from circular patterns.

In another embodiment of the invention, interference patterns are used to indicate layer alignment. Moire patterns can be produced from overlayed evenly spaced patterns that have an angular difference or different periodicity. Therefore, by placing all or part of a repeating structure on separate layers, a change in alignment of a layer can produce a different pattern that can be correlated to the misalignment of the layers. FIGS. 27 and 28 show moire interference patterns obtained from evenly spaced lines deposited on each layer with different spacing frequencies or angular alignments. FIG. 27 represents two grids of evenly spaced lines (191, 192) on different layers with a moire pattern produced from the angular misalignment of the two layers. FIG. 28 illustrates a moire pattern (193) produced from a circular pattern overlaying a grid of evenly spaced lines.

Bonding is an issue in many industries, and many techniques have been developed which involve one or more of the mechanisms of; mechanical interlocking, electronic attachment, boundary layer and interphase bonding, adsorption, diffusion, and chemical bonding. Although these mechanisms are well understood and methods for bonding have been successfully used in many industries, bonding may still pose difficult problems. Successful bonding depends on many factors including: the materials to be bonded, the condition of the surfaces to be bonded, the bonding method and its operational parameters, and the environmental conditions. In microfluidics, bonding represents a difficult problem due to the requirements of maintaining the integrity of the microstructures while forming a good seal around the micro-channels.

Bonding techniques may be broadly classified into two categories: area bonding, in which the entire surfaces of two substrates are bonded together; and selective bonding, in which selective regions on the surfaces are bonded together. Both techniques may be applied to microfluidic bonding. Typically selective bonding is the more expensive technique to implement in production, but the spatial control of the bonding seal may be greater, reducing the risk of interfering with microstructures.

A further consideration with bonding techniques is whether an auxiliary material is required to form the bond, and if so whether the material will be compatible with the current processes and application when in use. Table 1 sets out categories of some of these bonding techniques.

TABLE 1

Bonding Techniques

| Bonding | Direct surface-to-surface | Auxiliary Materials Required |
|---|---|---|
| Area | Diffusion | Adhesives |
|  | Surface modified | Solvents |
| Selective | Transmission Laser Welding | Adhesives |
|  |  | Absorption Materials |
|  | Reverse Conductive Welding | (Microwave, UV/Visible, IR) |
|  | High Frequency & Ultrasonic Welding |  |
|  | Surface modification with masking |  |

The diffusion method is a common batch-based technique that involves applying pressure and temperature while bringing substrate surfaces together and allowing time for the molecular chains from each material to slowly diffuse into one another. Typically, this requires similar materials having molecular chains with sufficient mobility. Although many layers can be bonded at once, care needs to be taken with voids weakening bonding layers and relatively long processing times are necessary.

Surface modification by techniques such plasma, corona, or UV assisted bonding involve changing the surface chemical groups to improve bonding via electronic or covalent coupling. Typically, the exposure of a polymer in an oxygen atmosphere by one of these techniques can lead to an increase in the surface oxygen groups, which increases the surface energy and enhances bonding for many substrates. Other gases and liquids on the surface can be exposed to produce other functional surface groups. Many of the reaction pathways created by these exposure techniques involve unstable free radical species. Therefore, such surface pre-treatments need to occur immediately prior to bonding. Similarly surface modification techniques have been used to alter the surface properties by softening the material in the immediate vicinity to the surface. For example chemical, UV and Plasma exposure have been used to cause polymer degradation at the surface, thereby lower the materials glass transition temperature and allowing bonding at lower interfacial temperatures.

Selective bonding can also be achieved by surface modification if masking techniques are used, ensuring the exposed areas are limited.

Adhesive bonding is the use of another material to act as a linker to bond two surfaces together. Adhesives can be coated over an entire surface by sprays, wire bars, doctor blades, rollers, or laid down as a sheet or tape, or selectively deposited by printing techniques or with patterned adhesive sheets or tapes. Typical adhesives include: cyanoacrylates, silicones, epoxies, and acrylic based materials. Two concerns with this type of bonding are the compatibility of the adhesive with materials used and the intended application. Lifetime performance, toxicity and surface interactions are also considerations, particularly for microfluidic devices in which the surface to volume ratios are so large.

Lamination is a popular technique for joining plastic films by bringing the materials together with one of the films having an adhesion layer. This adhesion layer may be an adhesive as described above or a polymer with a lower glass transition temperature that will flow under temperature and pressure to bond to the other surface. These methods are widely used in the printing and packaging industries on reel to reel systems and have been successfully applied to microfluidic devices. See, for example, Schwarz et al., "Microchannel Networks for Electrophoresis Separations," 20 Electrophoresis 727 (1999).

Solvent assisted bonding uses solvents to swell the polymer surfaces and increase the chain mobility to allow the two surfaces to diffuse into one another. A problem with this technique is the difficulty of handling the solvents in the production environment. For fluidic devices, the solvent residues can provide a source of contamination, and for microdevices the solvent may deform the microstructures.

Transmission laser welding operates by one material being transparent to and the other material being an absorber to the irradiated laser wavelength. This allows the laser beam to selectively heat between the two materials producing localized welding when the heat goes above the glass transition temperature. For integration into the production environment, the main limitations are processing times, and limitation of compatible materials and number of layers that can be processed.

Reverse conduction welding operates in a similar manner to transmission layer welding except that the heat is generated by laser absorption at a backplane. The polymer films clamped above the absorbing layer conduct the heat from its surface and locally melt. Due to the uniform heat conduction within the polymers which limits spatial resolution, the technique is only suitable for thin films and relatively large structures.

High frequency or dielectric heating is a technique that can bond polar materials by passing an AC current through them. This method can be effective for bonding materials that would normally degrade near their softening point. This is because the heat is generated uniformly in the material rather than at the surface and then conducted inwards. However, for microstructures, this can introduce problems due the non-specific heating and cause deformation.

Ultrasonic welding depends on vibration energy being transmitted through the materials. At the interface of the two materials the vibrationary energy is translated into heat. Features can be used to focus the energy, and with careful energy control and geometry design around structured parts, a good seal can be achieved without deforming the remaining material.

The deposition of specific energy absorbing materials in the proximity of the join can be also be used to induce localized melting and, therefore, selective bonding when irradiated by the appropriate energy sources. Energy absorbers include thin film metals, Clearweld™, polyaniline, polypyrrole, polyalkylthiophenes, metallic nanoparticles, magnetic and paramagnetic particles and other appropriately doped materials. Energy sources include electromagnetic, microwave, UV/Visible, and infrared radiation. For sealing microstructures the effectiveness is typically dependent on the limitations of the deposition technique for the material.

All of the processes described above can be used in continuous manufacturing and are applicable to the process according to the present invention described herein.

An embodiment of the process according to the present invention includes the use of control systems to control the bonding process. Parameters in the control system loop may include, but are not limited to, temperature, pressure, time, speed, and film tension, to provide better bonds.

Certain design rules are applicable to bonding layered devices. These include the operational parameters associated with the particular bonding process, such as the temperature profile, dwell time, speed, tension, pressure, and pre-treatment requirements. However, they also include design rules in which device design can improve the processing performance. Design rules may include manufacturing design rules, such as minimum feature sizes, distance between features, aspect ratios, and sharpness of features for improved cuts and avoiding material catching on the tools. Design rules may also include application design rules that are unique for the intended device usage. Examples of application design rules include, but are not limited to, geometries for control, dead volumes, diffusion rates for mixing, contact surface areas, and fluid control for either passive or active components.

Figure 29:
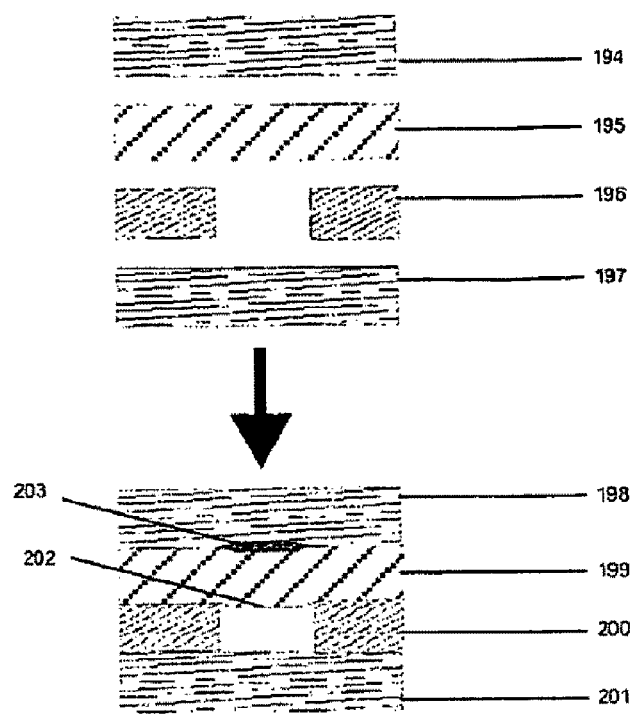
FIG. 29 illustrates a poorly formed bond from a single step bonding procedure.
Figure 30:
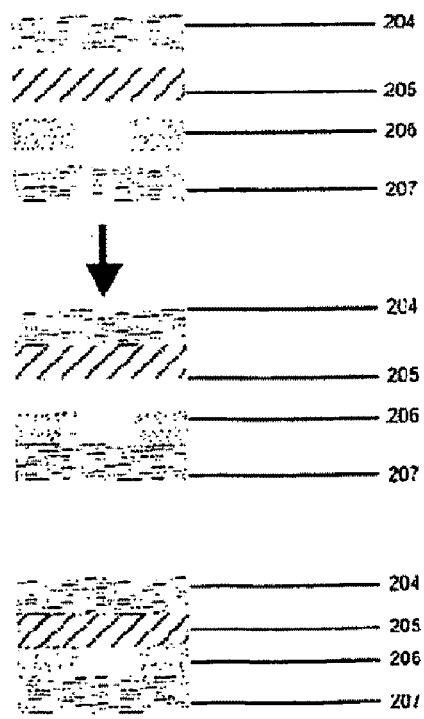
FIG. 30 illustrates the same structure of FIG. 29 formed in a multi-step bonding procedure.

The order for bonding the various layers in fluidic devices is a consideration when using pressure-bonding techniques to join layered structures. This is because the voids formed from the microstructures cause a drop in the applied pressure for the regions immediately above and below the structure. If the bonding process relies on pressure, then the bonded layers adjacent to the voids may not form a bond as strong as that formed where the pressure is applied. A typical scenario, depicted in FIG. 29, illustrates a cross section of a channel in a device of four layers (194, 195, 196, 197) prior to bonding, and after bonding (198, 199, 200, 201). In this example of a one step bonding process the laminated film above the channel is not be supported by further layers and is deformed into the channel region (202) leaving a void, or weakly bonded region (203), immediately above the channel. This can be avoided by bonding the layers adjacent to the microstructures prior to bonding to the microstructure. As shown in FIG. 30, a two step bonding process is used. First, layers (204) and (205) are bonded and layers (206) and (207) are bonded, and then the four layers are bonded together.

Figure 31:
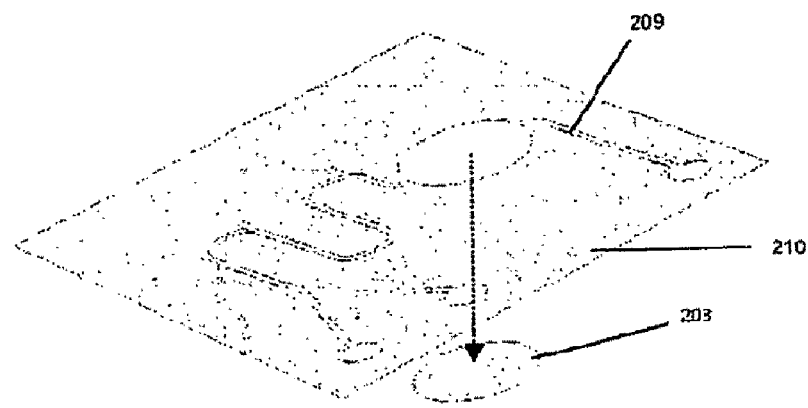
FIG. 31 illustrates the loss of unsupported cut-outs in a machined layer.

Another consideration is the layout of the structured layers to avoid cut-outs from falling out and the misalignment of features. As illustrated in FIG. 31, the center ring (208) of a microfluidic structure (209) is left unsupported from the substrate (210). If structures machined entirely through a layer overlap and form an island of material, then that island will drop out of the structure if not supported. Similarly, if a structure is other than a straight line then, depending on the size of the structure and the angles traversed from the straight-line case, some freedom of movement of parts of the substrate may occur. This can produce blockages and deformations in the intended microstructure. A method to avoid both cut-outs and misalignments includes splitting up the design over multiple layers (see FIGS. 20A-D), as discussed earlier in the structuring process and described by U.S. Patent Application Publication 2002/0112961 A1, for film sag with structure geometries having angles substantially greater than 90°.

Figure 32A:
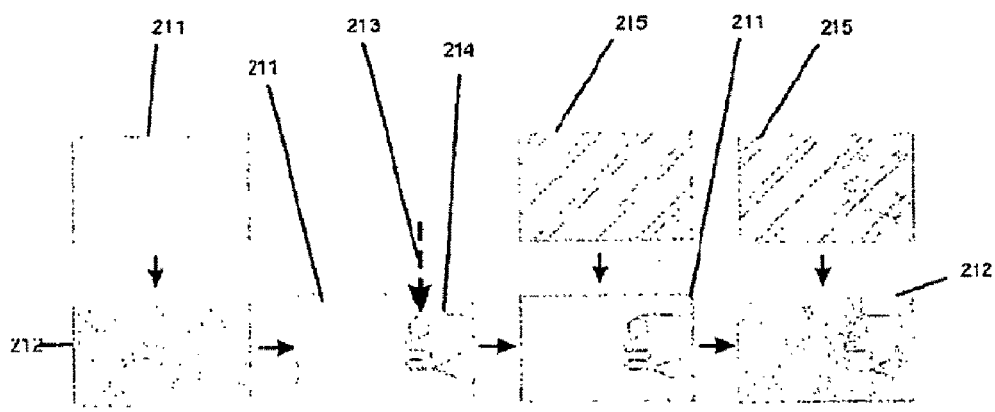
FIGS. 32A and 32B illustrate the use of support materials during the machining processes.
Figure 32B:
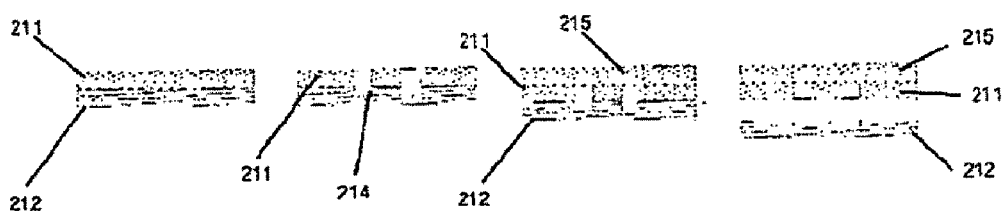

Another method for avoiding loss of cut-outs or misalignments is to provide a supportive matrix. An example of this is illustrated in FIGS. 32A and 32B where the top and side views are shown, respectively. Firstly, the layer to be structured (211) is bonded to a sacrificial layer (212) prior to machining (213) of a microfluidic structure (214). Before the feature can be released from the sacrificial material (212) the substrate is either temporarily, or permanently, bonded to another substrate (215) to prevent movement from occurring. If the structuring process occurs prior to bonding then the structure is only partially formed before bonding, and finished afterwards. Bonding prior to structuring can involve only a partial bond before the removal of the sacrificial (212) layer after structuring and then bonding to another substrate (215). Alternatively, if bonding is performed prior to the operation and the structuring process only goes through one layer (as discussed earlier in FIGS. 20A-D), then the resultant structure may be removed, in a similar manner to the lift-off technique.

In some cases formed devices may warp after bonding due to internal stresses in the materials used. Methods to overcome this problem may include adjusting the individual layer tensions prior to bonding, providing a pre-treatment to one or more layers before or after bonding, or providing such methods during the bonding processes, for example with differentially heated rollers. Methods of providing pre-treatments include laser, IR, and flame, and may involve flash heating of the layers to prestress the layers prior to bonding. Alternatively, providing different tensions on different layers may control the resulting stress of the formed structure. An example for a use of this would be to counteract a tendency for the device to curl around a roller by providing an opposing tension, or stress, related force in the device prior to bonding.

Figure 33:
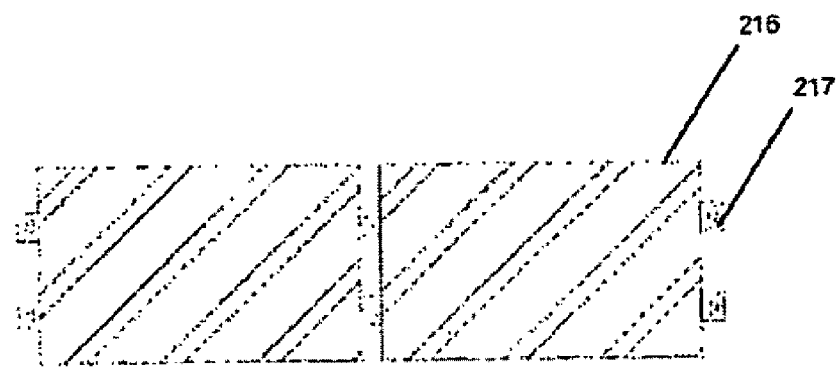
FIG. 33 illustrates in-plane relief structures between layered devices on the same substrate.
Figure 34:
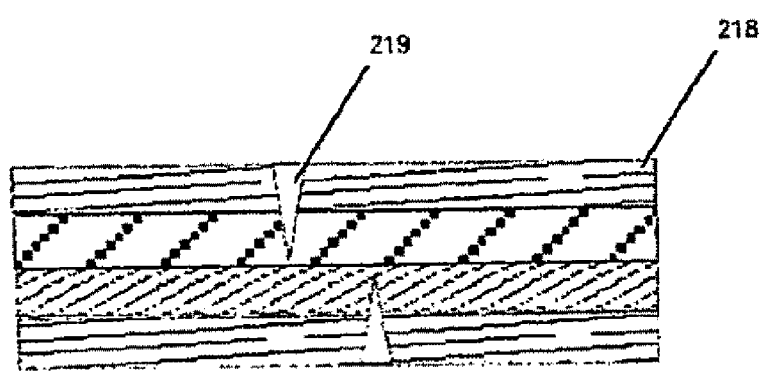
FIG. 34 illustrates out-of-plane relief structures between layered devices on the same substrate.

Another technique involves providing structures on the actual device that help relieve the induced substrate stresses. FIGS. 33 and 34 show examples of these structures for in plane and out of plane stresses respectively. FIG. 33 shows the top view an example of stress relieving structures (217) placed between multilayer devices (216). FIG. 34 shows part of a cross section of a four layer device (218) containing stress relieving structures (219) through the top and bottom surfaces.

Figure 35:
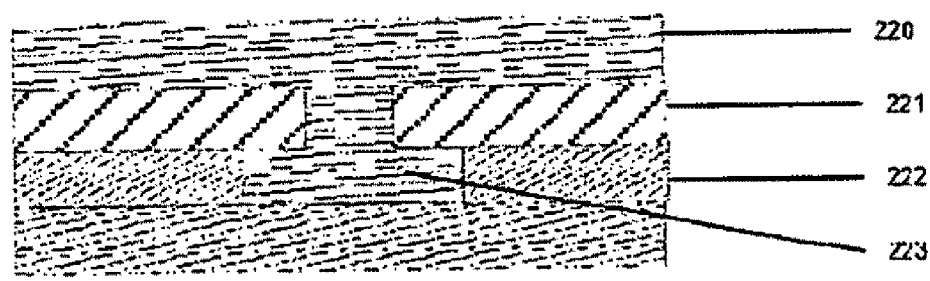
FIG. 35 illustrates a method of mechanical interlocking for bonding multilayered materials.

The process according to the present invention also allows for adhesiveless bonding by mechanical interlocking. This is useful for the incorporation of metals and fluorinated polymers. Structures are formed around and/or through one layer that will allow the flow of another layer to flow into the structures to produce undercuts that will mechanically join the two materials together. An embodiment of this can be seen in FIG. 35, where the top layer (220) flows into the void (223) of the third layer (222) during the bonding process to mechanically interlock the second layer (221).

Surface modification enhanced bonding methods often require immediate bonding after the surface exposure. Web based systems and the process according to the present invention are particularly suitable for these methods by providing automated and integrated exposure and bonding stages.

For ultrasonic bonding the formation of lips, or raised edges, at the critical points for bonding, which are typically around the microfluidic edges, can help concentrate the energy and improve the bond. In the process according to the present invention stamping, cutting, embossing and/or laser machining can be used to form such raised edges.

Surface modification techniques have been used in many industries to improve the surface properties of a material. In particular polymers often contain the required bulk physical and chemical properties, but lack the surface characteristics necessary for a particular application. In the printing and packaging industries many techniques have been developed to improve these characteristics for bonding, wettability, and presentation. Table 2 list some of these technologies.

TABLE 2

Surface-Treatment Technologies

| Technique | Process | Types | Technology Status | Comments |
|---|---|---|---|---|
| Abrasion | Mechanical | Dry or wet blasting, hand or machine sanding | Obsolete | Labour-intensive, dirty, applicable only for low production volumes, must deal with residuals. |
| Solvent cleaning | Physical and Chemical | Wiping, immersion, spraying or vapor degreasing | Obsolete | Safety, disposal and environmental concerns (i.e., emissions) |
| Water-based cleaning | Physical | Multistep power wash | Contemporary | Low environmental systems impact, high volume capacity, and relatively low cost. |
| Chemical etching with acids or bases | Chemical | Immersion, brushing, rinsing, spraying | Obsolete | Safety issues due to the use of corrosive, toxic materials and hazardous-waste disposal problems. |
| Chemical primers | Chemical | Solution application of polyethyleneamine, polyurethanes, acrylates, chlorinated polymers, nitrocellulose, or shellac | Mature | Requires specific equipment, and different primers are necessary for specific end-use requirements. |
| Flame treatment | Thermal and chemical | Available for flat films or three-dimensional configurations | Mature | Fire hazard, limited to some extent to thermally insensitive materials. |
| Corona discharge | Electrical and chemical | Available for both conductive and dielectric substrates | Contemporary | Applicable primarily to films and webs |
| Gas plasma | Electrical and Chemical | Available for film or three dimensional applications can use ac, dc, or microwave frequency | Contemporary | Convenient and cost effective; non toxic materials or disposal issues; can be effective in numerous different configurations |
| UV and UV/ozone | Electrical and Chemical | For distinct parts in batch systems. | Developmental, Contemporary | Generally only in batch format and requires longer residence times |
| Evaporated acrylate coatings | Physical and Chemical | Currently for webs and films only | Developmental, Contemporary | Still being developed for commercial-scale applications |
| Fluorination | Chemical | Short exposure to elemental fluorine can be batch or continuous | Developmental, Contemporary | Specialized equipment required for delivery and monitoring fluorine. |
| Electrostatic discharge control | Electrical | Can be in the form of charge dissipation or charge neutralization | Contemporary | Equipment can be simple through complex and expensive, depending on the application |

The Wiley Encyclopaedia of Packaging Technology, Second Edition, Edited by Aaron L. Brody and Kenneth S. Marsh - ISBN 0-471-063975-5 © 1997 by John Wiley & Sons, Inc Each of the aforementioned techniques have their own disadvantages regarding implementation, lifetime, and performance characteristics. For microfluidic devices the issues of bonding and surface interactions are critical due to the size of the structures and the large surface to volume ratios. For these applications the surface modification techniques are used to address a wide variety of needs. Table 3 lists some of the improvements that can be achieved through surface modification for microfluidic devices.

TABLE 3

Surface Modification Objectives

| Product integration & Cleaning | Fluid Control | Molecular Interactions & Biocompatibility |
|---|---|---|
| Modify surface for bonding | Control of surface energy for wettability (incl. hydrophylicity and hydrophobicity) | Prevent sticking of proteins/enzymes to the fluidic structures |
| Change Optical properties | Minimize loss of fluid due to water vapor permeability | Promote sticking of proteins/enzymes to the fluidic structures |
| Increased surface energy and groups for sensors and actuators | Minimize loss of fluid due to water absorption | Prevent inhibition of processes due to surface character/leachables |
| Remove contamination | | Provide surface groups for molecular attachment |

As discussed above, bonding is an issue in many industries, and the surface interaction plays a role in the mechanisms of electronic attachment, boundary layer and interphase bonding, adsorption, diffusion, and chemical bonding. Changes in the surface molecular groups can produce changes in refractive index directly, or indirectly by changing the surface energy to attract molecules in the environment to form a surface coating. Changing the surface energy can be directly applied to many sensors and actuators that rely on surface charges. Surface modification methods can also be used to remove absorbed or bound materials on the surface, or to change the surface energy to repel other particles, for example, to avoid contamination.

Fluid control within capillaries and other microstructures is dominated by the liquid to surface interaction. It is vital in these passive and active fluid handling components to control the surface energy, and therefore the hydrophylicity or hydrophobicity. In applications in which limited volumes of fluid are stored within the device then it is important to limit water loss through absorption and permeability. This is particularly critical for small volumes of reagents where the concentrations are important, a loss of fluid can cause failure of a device by changing the reagent concentration.

To ensure surface compatibility within an intended application, in some cases the surface can be modified to improve this compatibility. In other cases the surface modification process used to improve one property, such as bonding, may be detrimental to device performance. This is often the case for biological applications in which biological molecules can be absorbed onto a surface. Proteins may be inhibited and impair device function if strongly absorbed onto a surface, likewise a barrier layer on the surface may be required to prevent inhibiting molecules from leeching out of the material into the device. Alternatively, proteins, DNA or other molecules may be required to be bound to the surface, either electronically absorbed or chemically linked through covalent bonds.

The process according to the present invention may incorporate methods to modify material surfaces, including any of the methods described above. In particular wet chemical, laser and UV exposure, corona, flame and plasma methods may all be integrated into a high throughput process according to the present invention. For pattern formation, some of these methods require masking techniques to limit the exposed areas. These masking methods may include either contact or contact-less masking processes, and may involve the lift-off technique in a similar manner as described previously.

Waveguide, or light pipe, fabrication is important for improving sensor response and design by guiding excitation and/or emission light. A waveguide operates by reflecting, or transmitting, incident light at a material boundary. In the past typical fabrication methods in microfluidic devices have involved either using the entire planar material, inserting a fibre optic directly into the sensor system, or lithographically patterning the surface in a similar manner to the fabrication of semiconductor devices.

An example of a method for improving the wave-guiding properties of a transparent material is to increase the difference in refractive indices at the material boundaries. Changes to the surface properties at these boundaries can induce refractive index changes for improved reflection or transmission. In particular, deposition of thin films can provide improved surfaces for waveguides and reflective surfaces. An example of this would be the deposition of a thin (nm) silver coating to provide a negative refractive index.

Figure 36:
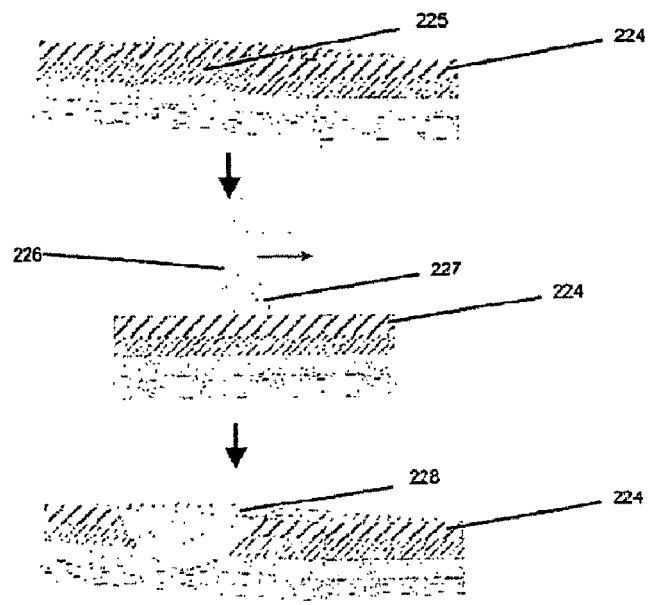
FIG. 36 illustrates the filling of channels for waveguide formation.

In order to guide light in complex geometries, channels may be formed with pre-structured layers. The channels may then be filled as required. These structures may be filled by any suitable method, for example, by injecting and then curing an optically transparent material, or by placing an already formed light pipe into the vacant structures. FIG. 36 illustrates a channel being filled with a liquid by doctor blade coating. In this example, a multilayered substrate (224) with a preformed channel (225) is filled with a liquid (227) with the aid of a doctor blade (226) to produce a waveguide (228) in the substrate (224). An example for the incorporation of pre- fabricated light pipes into a layered structure was described in relation to FIGS. 13A and 13B.

Printing text, markers and decorative layers are used in manufacturing to provide for device function, serviceability, and market appeal. Printing can be performed on outer surfaces of a device and, in the case for layered devices, can be produced on an internal layer of the product. Possible printing processes can be categorized as follows;

Screen printing, where the ink is forced through a partially masked screen or plate;

Methods that transfer ink from a surface carrying the required design, such as flexographic or letterpress printing;

Thermal transfer methods, such as with laser and thermal ribbon printers;

Methods where the ink is transferred from an engraved surface, as with photogravure;

Methods where the ink is transferred from a plain surface as in lithography;

Methods that deposit the pattern by dot or continuous ink processes, as with inkjet printers.

The ability to program onboard memory devices provides specific device information on chip, such as instruction data, traceability, history and function.

Encoded information includes:
Serial numbers;
Manufacturing history;
Operation instructions;
Operation history;
Service data;
Functional commands.

Methods of programming on board memory devices may include: electrical contacts, wireless antenna, magnetic coupling, induction, and optical.

In the context of quality control, systems are provided for ensuring the maintenance of proper standards in manufactured products. In manufacturing methods for discovery, analysis, improvement, monitoring, implementation, and verification can all be used to control product quality. For there to be control over a process, a method of discovery or monitoring is provided, and a path for feedback to modify the process, if necessary. This may occur at any stage during or at the end of the process. Monitoring during the process provides a potential reduction in resource waste by identifying and removing the problem earlier. Methods of inspection to provide the feedback signal can involve human observation, mechanical, acoustic, electrical, electromagnetic, and/or optical systems.

One further problem facing the implementation of high throughput web based and sheet based production lines is the finite capacity of computers and industrial controllers to both monitor and control multiple stages in a process. This difficulty impacts on quality control, quality assurance and limits throughput.

Therefore, another embodiment of the invention comprises distributed monitoring and control systems throughout the process. According to this embodiment, individual fabrication stages may be self controlled and may inspect and label or program output material as having passed or failed so that subsequent or other disassociated controllers may read this information and process the material accordingly. A further advantage of such a system is that buffer stock of partially completed material can be machine identified and later processed correctly according to this identification without the need for persistent computing memory of product process level and location. A further advantage is that material can be manually handled and processed and returned to a production line and recognized and processed accordingly. This system therefore obviates dedicated storage and dedicated transfer lines as material is recognized and routed appropriately wherever it enters the system. An example of this would be a partially completed web based reel loaded production returned to the input point after, for example, maintenance, and the already completed processing stages would recognize and then ignore the web product until it reached its next scheduled stage in the process, thereby also obviating any unnecessary changes to the production line to accommodate the partially complete product. Another example would be manual repairs of rejected sheet based material and this material could be returned to the production line at any stage and recognized and routed accordingly to its next processing stage.

A further advantage of this embodiment is that material could be automatically routed to buffer storage if a production module fails and returned when the module is repaired or replaced. This feature obviates loss of partially processed stock by subsequent processing before preparative fabrication has occurred.

An additional advantage is that the production computing system merely supervises the production and does not control it, thereby allowing dynamic flexibility and a high level of fault tolerance and fault recovery and high throughput not hampered by data processing bottlenecks.

Figure 37:
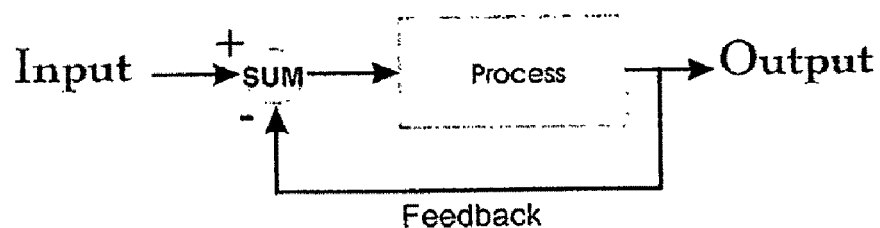
FIG. 37 shows a simple control loop configuration around a process module.

Feedback systems are a part of the process according to the present invention. Feedback may be provided in any suitable form and at suitable locations throughout the process. For example, feedback may be provided within each modular unit, as shown in FIG. 37. According to this embodiment, feedback may be used for multiple possible applications, for example, selecting material or processing types, controlling the temperature and pressure of bonding rollers, providing optical inspection of debris and cut quality, ensuring suitable film tension, adjusting material speed and alignment, and ensuring proper processing station dwell times and operational parameters.

Figure 38:
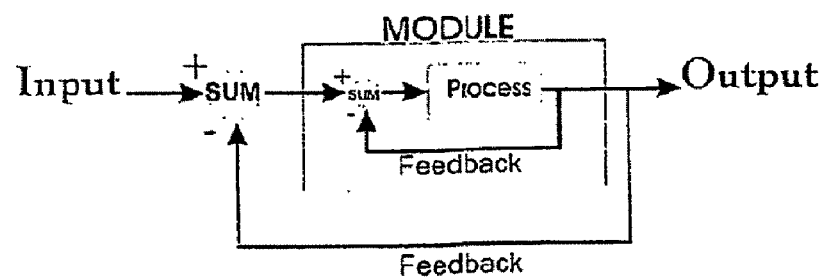
FIG. 38 shows a control loop configuration with feedback inside and external to the process module.
Figure 39:
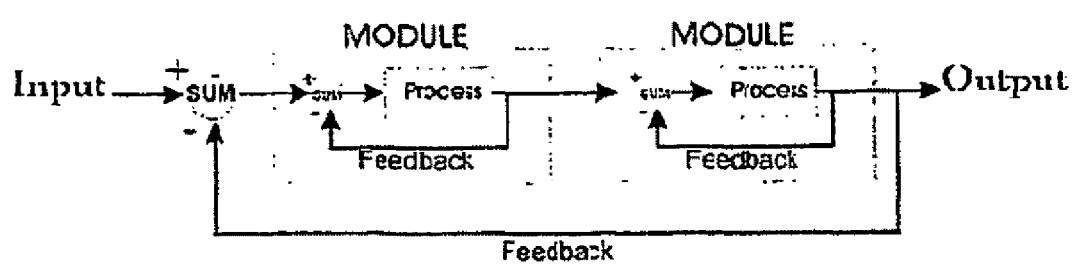
FIG. 39 shows a control loop configuration with feedback around individual and multiple processing modules.

Feedback between modules may also be provided to ensure suitable material feed rates and material types, and passing control signals between inspection points and process. FIGS. 38 and 39 depict some of the basic feedback architectures with feedback inside processing modules, outside individual processes, and between multiple processes.

Examples of specific sensory methods include:
Temperature, pressure, time, speed, and film tension as described in the bonding discussion above;
Pattern recognition as described in the alignment discussion above;
Pattern recognition to identify product structure based off comparison with known images;
Use of gas or liquid dies and fluorescence to observe channel integrity;
Surface coatings and materials that changes colour or fluorescence under certain conditions such as temperature, pressure, or exposure to other materials;
The use of neural networks, fuzzy logic, and similar adaptive and control processing methods.

The process according to the present invention allows for continuous monitoring of individual components for product tracking and control purposes. Component identification can be provided by any suitable method, for example by; printed methods, such as visible and UV indicator marks, text or barcodes; semiconductors, providing memory storage; or using other technologies, such as RFID.

Methods of packaging can be easily implemented in the process according to the present invention due not only to its flexibility, but also some of the techniques used for the actual device manufacture are the same as those used in the packaging industry. Conventional packaging technology for any combination of parts, including individual, multiple, or reels of components at the device level, customer level packaging, and packaging for shipping. In some cases sterilisation is used, including ethylene oxide, gamma radiation, electron beam and autoclaving.

Although the present invention has been described in connection with the embodiments disclosed herein, it will be appreciated by those skilled in the art that additions, deletions, modifications, and substitutions not specifically described may be made without department from the spirit and scope of the invention as defined in the appended claims.

What is claimed is:

1. A process for manufacturing a microfluidic device, the process including a first processing that removes material followed by an embossing process, wherein the first processing improves the embossed structure replication; wherein the first process removes the device material to form cut-outs that mate with the embossing tool during the embossing process to reduce the amount of displaced material during the embossing process; or wherein the first process removes the device material to form undercut layers that control the flow displaced material into the undercut areas during the embossing process.

* * * * *